US012657378B2

(12) United States Patent
Sarkar et al.

(10) Patent No.: US 12,657,378 B2
(45) Date of Patent: Jun. 16, 2026

(54) TECHNIQUES FOR FORMULA DEBUGGING

(71) Applicant: MICROSOFT TECHNOLOGY LICENSING, LLC, Redmond, WA (US)

(72) Inventors: Advait Sarkar, Cambridge (GB); Sruti Srinivasa Ragavan, Cambridge (GB); John Herbert Martin Williams, Cambridge (GB); Ian Zachariah Drosos, Cambridge (GB); Nicholas Charles Wilson, Cambridge (GB); Irena Berezovsky, Herzliya (IL); Lev Solodkin, Herzliya (IL); Andrew Donald Gordon, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 82 days.

(21) Appl. No.: 18/401,217

(22) Filed: Dec. 29, 2023

(65) Prior Publication Data

US 2025/0111134 A1     Apr. 3, 2025

Related U.S. Application Data

(60) Provisional application No. 63/542,081, filed on Oct. 2, 2023.

(51) Int. Cl.
*G06F 40/18* (2020.01)

(52) U.S. Cl.
CPC .................................... *G06F 40/18* (2020.01)

(58) Field of Classification Search
CPC ......... G06F 40/18; G06F 40/16; G06F 40/146
See application file for complete search history.

(56) References Cited

U.S. PATENT DOCUMENTS 5,255,356 A     10/1993   Michelman et al.
5,627,980 A      5/1997   Schilit
(Continued)

FOREIGN PATENT DOCUMENTS

CA        2586480 A1     6/2006
CN      106227668 B     12/2016
(Continued)

OTHER PUBLICATIONS

Mayuri V. Sadaphule et al., An Application of Database Query Translation Into Spreadsheets, Mar. 1, 2016, International Conference on Electrical Electronics, and Optimization Techniques, pp. 1-6 (Year: 2016).*
(Continued)

*Primary Examiner* — Tam T Tran
(74) *Attorney, Agent, or Firm* — David Foster; Newport IP, LLC

(57)     ABSTRACT

Disclosed are novel approaches to debugging a formula in a spreadsheet environment. An execution trace shows step-by-step how a formula is evaluated. Instead of overwhelming users by displaying a step for every atomic evaluation, multiple evaluations are displayed in the same step. This makes the execution trace compact yet intuitive, enabling users to quickly and efficiently understand how the formula is evaluated. Visualizing formula execution in this way also reduces the computing and energy costs of excess recalculations incurred by trial-and-error based debugging techniques.

20 Claims, 26 Drawing Sheets

(56)                References Cited

U.S. PATENT DOCUMENTS

| | | | |
|---|---|---|---|
| 7,275,207 | B2 | 9/2007 | Aureglia et al. |
| 8,438,551 | B2 | 5/2013 | Tonkin et al. |
| 8,655,861 | B2 | 2/2014 | Burke |
| 10,140,279 | B2 | 11/2018 | Zia |
| 10,552,532 | B2 | 2/2020 | Otero |
| 10,831,983 | B2 | 11/2020 | Bathla |
| 11,694,023 | B2 | 7/2023 | Dvorak |
| 2003/0188257 | A1 | 10/2003 | Aureglia et al. |
| 2003/0188258 | A1 | 10/2003 | Aureglia et al. |
| 2003/0188259 | A1 | 10/2003 | Aureglia et al. |
| 2005/0128219 | A1 | 6/2005 | Beal |
| 2012/0042242 | A1 | 2/2012 | Garland et al. |
| 2017/0344457 | A1* | 11/2017 | Wagiaalla ........... G06F 11/3624 |
| 2020/0257852 | A1* | 8/2020 | Canton ................. G06F 40/151 |
| 2023/0019933 | A1 | 1/2023 | Wang |
| 2023/0114508 | A1 | 4/2023 | Dvorak |

FOREIGN PATENT DOCUMENTS

| | | |
|---|---|---|
| CN | 106650437 A | 5/2017 |
| CN | 114692532 A | 7/2022 |
| CN | 115481873 A | 12/2022 |
| CN | 115525629 A | 12/2022 |
| KR | 20210034188 A | 3/2021 |

OTHER PUBLICATIONS

Leo Antunes et al., Automatic Spreadsheet Generation from Conceptual Models, Sep. 1, 2015, Brazilian Symposium on Software Engineering, pp. 1-10 (Year: 2015).*
Negreanu, et al., "Rows from Many Sources: Enriching row completions from Wikidata with a pre-trained Language Model," In Proceedings of Companion Proceedings of the Web Conference, Apr. 25, 2022, 11 Pages.
O'Beirne, Patrick, "Horror Stories," Aug. 10, 2023, 33 Pages.
Panko, et al., "Hitting The Wall: Errors In Developing and Code Inspecting A 'Simple' Spreadsheet Model," In Journal of Decision Support Systems, vol. 22, Issue 4, Apr. 1998, pp. 337-353.
Panko, et al., "Revising the Panko-Halverson Taxonomy of Spreadsheet Errors," In Journal of Decision Support Systems, vol. 49, Issue 2, May 2010, pp. 235-244.
Panko, Raymond R, "Spreadsheet Errors: What We Know. What We Think We Can Do," In Repository of arXiv:0802.3457, Feb. 23, 2008, 9 Pages.
Perera, et al., "Functional Programs That Explain Their Work" In Proceedings of the 17th ACM SIGPLAN International Conference on Functional Programming, Sep. 9, 2012, pp. 365-376.
Pieterse, et al., "Microsoft Tech Community," Aug. 1, 2022, 16 Pages.
Ragavan, et al., "Spreadsheet Comprehension: Guesswork, Giving Up and Going Back to the Author", In Proceedings of the 2021 CHI Conference on Human Factors in Computing Systems, May 7, 2021, 21 Pages.
Rajalingham, et al., "Classification of Spreadsheet Errors," In Repository of arXiv:0805.4224, May 27, 2008, 9 Pages.
Reithel, et al., "An Experimental Investigation of the Effects of Size, Format, and Errors on Spreadsheet Reliability Perception," In Journal of Computer Information Systems, https://www.tandfonline.com/doi/abs/10.1080/08874417.1996.11647208, vol. 36, Issue 3, Mar. 1996, pp. 54-64.
Ruthruff, et al., "End-user Software Visualizations for Fault Localization," In Proceedings of the ACM symposium on Software visualization, Jan. 2003, pp. 123-132.
Ruthruff, et al., "Six challenges in supporting end-user debugging," In Proceedings of ACM SIGSOFT Software Engineering Notes, May 21, 2005, vol. 30, Issue 4, 6 Pages.
Sarkar, et al., "End-User Encounters with Lambda Abstraction in Spreadsheets: Apollo's Bow or Achilles' Heel?", In Proceedings of IEEE Symposium on Visual Languages and Human-Centric Computing (VL/HCC), Sep. 12, 2022, 11 Pages.

Schalkwijk, et al., "Auditing spreadsheets: With or without a tool?" In Proceedings of the EuSpRIG Conference Spreadsheet Risk Management, 2015, 15 Pages.
Schmitz, et al., "An AI-based interactive tool for spreadsheet debugging," In Proceedings of IEEE Symposium on Visual Languages and Human-Centric Computing, Oct. 11, 2017, pp. 333-334.
Whitington, et al., "Direct Interpretation of Functional Programs for Debugging", In Proceedings of ML Family/OCaml Users and Developers Workshops, Sep. 7, 2017, pp. 41-73.
Whitington, et al., "Direct Interpretation of Functional Programs for Debugging," In Repository of arXiv:1905.06545, May 16, 2019, 193 Pages.
Whitington, John, "Debugging Functional Programs by Interpretation", A Thesis Submitted for the Degree of Doctor of Philosophy at the University of Leicester, Jul. 23, 2020, 193 Pages.
Williams, et al., "Understanding and Inferring Units in Spreadsheets", In Proceedings of IEEE Symposium on Visual Languages and Human-Centric Computing (VL/HCC), Aug. 1, 2020, 9 Pages.
"Create a Data Type (Power Query)," Retrieved from <<https://web.archive.org/web/20220410105921/https:/support.microsoft.com/en-us/office/create-a-data-type-power-query-a465a3b7-3d37-4eb1-a59c-bd3163315308>>, Apr. 10, 2022, 5 Pages.
"Create an Array Formula," Retrieved from <<https://web.archive.org/web/20220813004444/https:/support.microsoft.com/en-GB/office/create-an-array-formula-e43e12e0-afc6-4a12-bc7f-48361075954d>>, Aug. 13, 2022, 2 Pages.
"ISO/IEC/IEEE International Standard—Systems and software engineering—Vocabulary," In Publication of IEEE, Aug. 28, 2017, 536 Pages.
Abraham, et al., "GoalDebug: A Spreadsheet Debugger for End Users," In Proceedings of 29th International Conference on Software Engineering, May 20, 2007, 10 Pages.
Abraham, et al., "Visual Specifications of Correct Spreadsheets", In Proceedings of Symposium on Visual language and Human-Centric Computing, Sep. 20, 2005, 8 Pages.
Abreu, et al., "Constraint-based Debugging of Spreadsheets," In Proceedings of the Iberoamerican Conference on Software Engineering, Apr. 24, 2012, 14 Pages.
Acar, et al., "A Core Calculus for Provenance," In Journal of Computer Security, vol. 21, Issue 6, Dec. 20, 2013, pp. 919-969.
Ayalew, et al., "Spreadsheet Debugging," In Repository of arXiv:0801.4280, Jan. 28, 2008, 13 Pages.
Badame, et al., "Refactoring Meets Spreadsheet Formulas," In Proceedings of 28th IEEE International Conference on Software Maintenance, Sep. 23, 2012, pp. 399-408.
Bajaj, et al., "A Visual Notation for Succinct Program Traces," In Journal of Computer Languages, vol. 75, Jun. 2023, 9 Pages.
Bals, et al., "Classsheets—Model-Based, Objectoriented Design of Spreadsheet Applications," In Journal of Object Technology, vol. 6, Issue 9, Oct. 2007, pp. 383-398.
Barowy, et al., "Checkcell: Data debugging for spreadsheets" In Proceedings of the ACM International Conference on Object Oriented Programming Systems Languages & Applications, Oct. 19, 2014, 17 Pages.
Barowy, et al., "ExceLint: Automatically Finding Spreadsheet Formula Errors", In Proceedings of the ACM on Programming Languages, vol. 2, No. OOPSLA, Nov. 2018, 26 Pages.
Brown, et al., "An Experimental Study of People Creating Spreadsheets," In Journal of ACM Transactions on Information Systems, vol. 5, Issue 3, Jul. 1, 1987, pp. 258-272.
Burnett, et al., "End-user software engineering with assertions in the spreadsheet paradigm," In Proceedings of 25th International Conference on Software Engineering, May 3, 2003, 11 Pages.
Caballero, et al., "A Survey of Algorithmic Debugging," In Journal of ACM Computing Surveys, vol. 50, Issue 4, Aug. 30, 2017, 35 Pages.
Canteiro, et al., "Spreadsheetdoc: An Excel Add-In for Documenting Spreadsheets," In Proceedings of the 6th National Symposium of Informatics, 2015, 16 Pages.
Chambers, et al., "Automatic detection of dimension errors in spreadsheets," In Journal of Visual Languages & Computing, vol. 20, Issue 4, Aug. 2009, pp. 269-283.

(56) References Cited

OTHER PUBLICATIONS

Chambers, et al., "Struggling to Excel: A Field Study of Challenges Faced by Spreadsheet Users", In Proceedings of be IEEE Symposium on Visual Languages and Human-Centric Computing, Sep. 21, 2010, 8 Pages.

Chen, et al., "Visual Checking of Spreadsheets," In Repository of arXiv:0805.2189, May 15, 2008, pp. 75-85.

Cheusheva, Svetlana, "How to edit, evaluate and debug formulas in Excel" Retrieved from URL: https://web.archive.org/web/20230930054723/https://www.ablebits.com/office-addins-blog/evaluate-debug-formulas-excel/, Mar. 21, 2023, 13 Pages.

Chintakovid, et al., "Pair Collaboration in End-User Debugging," In Proceedings of Visual Languages and Human-Centric Computing, Sep. 4, 2006, 8 Pages.

Dietrich, Christian, "CppSig: Extracting Type Information for C-Preprocessor Macro Expansions," In Proceedings of the 11th Workshop on Programming Languages and Operating Systems, Oct. 25, 2021, 7 Pages.

Dobell, et al., "Spreadsheet Error Types and Their Prevalence in a Healthcare Context", In Journal of Organizational and End User Computing (JOEUC), vol. 30, Issue 2, Article 2, Apr. 1, 2018, pp. 20-42.

Drosos, et al., "Fxd: A Functional Debugger For Dysfunctional Spreadsheets," In Proceedings of IEEE Symposium on Visual Languages and Human-Centric Computing, Oct. 2023, 10 Pages.

Eisenstadt, Marc, "My Hairiest Bug War Stories," In Journal of Communications of the ACM, vol. 40, Issue 4, Apr. 1997, pp. 30-37.

Fisher, et al., "Automated Test Case Generation for Spreadsheets," In Proceedings of the 24th International Conference on Software Engineering, May 19, 2002, pp. 141-153.

Galletta, et al., "An Empirical Study of Spreadsheet Error-Finding Performance," In Journal of Accounting, Management and Information Technologies, vol. 3, Issue 2, Apr. 1993, pp. 79-95.

Galletta, et al., "Spreadsheet Presentation and Error Detection: An Experimental Study," In Journal of Management Information Systems, vol. 13, Issue 3, Dec. 1996, pp. 45-63.

Grigoreanu, et al., "End-User Debugging Strategies: A Sensemaking Perspective," In Journal of ACM Transactions on Computer-Human Interaction, vol. 19, Issue 1, Mar. 2012, 28 Pages.

Hendry, et al., "Creating, comprehending and explaining spreadsheets: a cognitive interpretation of what discretionary users think of the spreadsheet model", In International Journal of Human Computer Studies vol. 40, lumber 6, Jun. 1, 1994, pp. 1033-1065.

Hermans, et al., "Detecting and refactoring code smells in spreadsheet formulas", In Journal Empirical Software Engineering, vol. 20, Issue 2, Apr. 1, 2015, 30 Pages.

Hermans, et al., Spreadsheets are Code: An Overview of Software Engineering Approaches Applied to Spreadsheets, In Proceedings of IEEE 23rd International Conference on Software Analysis, Evolution, and Reengineering, Mar. 14, 2016, pp. 56-65.

Hermans, Felienne Frederieke Johanna, "Analyzing and Visualizing Spreadsheets," A Dissertation Submitted in Faculty of Electrical Engineering, Mathematics and Computer Science, Delft University of Technology, Sep. 2012, 174 Pages.

Hofer, et al., "Mutation-based spreadsheet debugging," In Proceedings of IEEE International Symposium on Software Reliability Engineering Workshops, Nov. 4, 2013, pp. 132-137.

Jones, Brian, "Announcing LAMBDA: Turn Excel formulas into Custom Functions", Retrieved From : https://techcommunity.microsoft.com/t5/excel-blogiannouncing-lambda-turn-excel-formulas-into-custom-functions/bap/p/925546, Dec. 3, 2020, 27 Pages.

Jones, et al., "A User-Centred Approach to Functions in Excel", In Proceedings of the 8th ACM SIGPLAN International Conference on Functional Programming, Aug. 25, 2003, pp. 165-176.

Kakulawaram, et al., "Spreadsheet Bubbles: Showing Contextually Relevant Data During Formula Editing," A thesis submitted in partial satisfaction of the requirements for the degree of Master of Science In Computer Science in the Graduate Division of the University of California, Berkeley, May 21, 2021, 31 Pages.

Kamin, Samuel, "A Debugging Environment for Functional Programming in Centaur," In Doctoral Dissertation of INRIA, Jun. 1, 1990, 27 Pages.

Kankuzi, et al., "A mental model perspective for tool development and paradigm shift in spreadsheets, "In International Journal of Human-Computer Studies, vol. 86, Feb. 2016, pp. 149-163.

Karthik Bhandary, "Property Rentals," https://www.kaggle.com/datasets/karthikbhandary2/property-rentals, Jul. 6, 2022, 7 Pages.

Kerneler, et al., "Chicago Relocated Vehicles," https://www.kaggle.com/datasets/chicago/chicago-relocated-vehicles, Dec. 6, 2019, 1 Page.

Kissinger, et al., "Supporting end-user debugging: what do users want to Know?" In Proceedings of the Working Conference on Advanced Visual Interfaces, May 23, 2006, pp. 135-142.

Ko, et al., "The State of the Art in End-User Software Engineering", In Journal of ACM Computing Surveys, vol. 43, Issue 3, Article 21, Apr. 29, 2011, 44 Pages.

Kohlhase, et al., "Context in Spreadsheet Comprehension," In Proceedings of the Second Workshop on Software Engineering Methods in Spreadsheets co-located with the 37th International Conference on Software Engineering, May 18, 2015, 7 Pages.

Kraynak, Steve, "Check your formula with value preview tooltips in Excel" Retrieved from <<https://insider.microsoft365.com/en-us/blog/check-your-formula-with-value-preview-tooltips-in-excel>>, Jan. 25, 2023, 3 Pages.

Lowe, Tony, "Debugging: The key to unlocking the mind of a novice programmer?" In Proceedings of IEEE Frontiers in Education Conference, Oct. 16, 2019, 9 Pages.

Mckeever, et al., "Can Named Ranges Improve The Debugging Performance of Novice Spreadsheet Users?" In Proceedings of the 21st Annual Workshop of the Psychology of Programming Interest Group, Jun. 24, 2009, 10 Pages.

Mukhtar, et al., "Spreadsheet debugging: The perils of tool over-reliance," In Journal of Systems and Software, vol. 184, Feb. 2022, 16 Pages.

Nardi, Bonnie, "A Small Matter of Programming: Perspectives on End User Computing," In Publication of MIT Press, https://www.amazon.com/gp/product/B09NWZWDFM?tag=randohouseinc7986-20, Jul. 15, 1993, 169 Pages.

Notice of Allowance mailed on Jan. 27, 2026, in U.S. Appl. No. 18/401,240, 09 Pages.

* cited by examiner

400

STEP 4
424

STEP 3
423

STEP 2
422

STEP 1
421

ASSETS
412B

ASSETS
412A

ASSETS
312

TAX PAID
346

EXPENSES
352

INCOME
350

(...)
322'

+
302

*
310'

INFLATION
342

(...)
320'

800

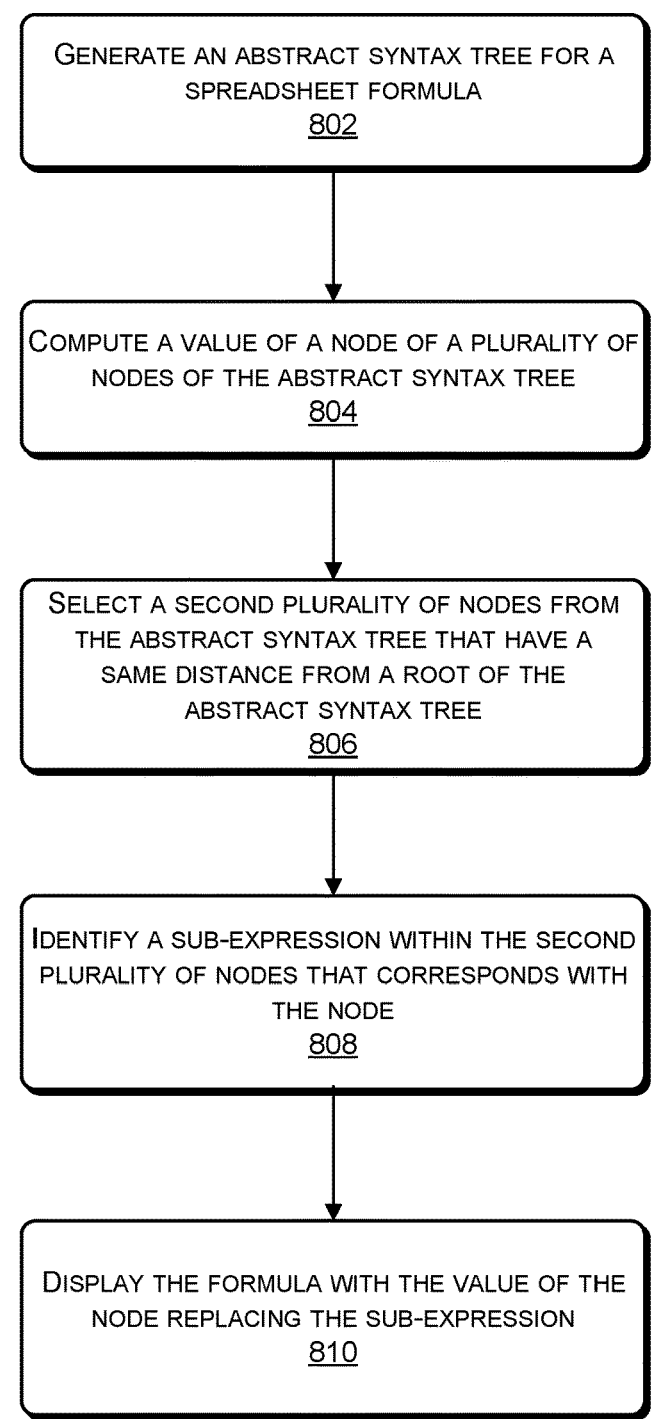

GENERATE AN ABSTRACT SYNTAX TREE FOR A
SPREADSHEET FORMULA
802

COMPUTE A VALUE OF A NODE OF A PLURALITY OF
NODES OF THE ABSTRACT SYNTAX TREE
804

SELECT A SECOND PLURALITY OF NODES FROM
THE ABSTRACT SYNTAX TREE THAT HAVE A
SAME DISTANCE FROM A ROOT OF THE
ABSTRACT SYNTAX TREE
806

IDENTIFY A SUB-EXPRESSION WITHIN THE SECOND
PLURALITY OF NODES THAT CORRESPONDS WITH
THE NODE
808

DISPLAY THE FORMULA WITH THE VALUE OF THE
NODE REPLACING THE SUB-EXPRESSION
810

CONSTRUCT A RANGE PREVIEW FROM AN
REFERENCE TO A SPREADSHEET RANGE
902

SELECTIVELY OMIT ROWS AND COLUMNS FROM
THE RANGE PREVIEW
904

DECORATE THE RANGE PREVIEW WITH A
FORMULA-AWARE TEXT EXPLANATION
906

AUGMENT THE RANGE PREVIEW WITH A
NEIGHBORHOOD CONTEXT
908

DISPLAY THE RANGE PREVIEW
910

TECHNIQUES FOR FORMULA DEBUGGING

PRIORITY APPLICATION

The present application is a non-provisional application of, and claims priority to, U.S. Provisional Application Ser. No. 63/542,081 filed on Oct. 2, 2023, entitled: TECHNIQUES FOR FORMULA DEBUGGING, the contents of which are hereby incorporated by reference in their entirety.

BACKGROUND

Spreadsheet formulas are instrumental in managing and analyzing data in fields including business, academia, and personal finance. Spreadsheet formulas automate calculations, saving a significant amount of time and reducing the potential for error. Spreadsheet formulas often auto-update when input data changes, ensuring the accuracy and timeliness of information. When used effectively, spreadsheet formulas can significantly enhance productivity, accuracy, and the ability to derive actionable insights from data.

However, spreadsheet formulas can become complex, making it difficult to identify the cause of unexpected results. One challenge is a lack of visibility into how a formula is evaluated, such as how intermediate steps are calculated. This lack of visibility into formula evaluation forces users to resort to trial and error and other ad-hoc techniques. Without visibility into how a formula is evaluated, the user must perform the evaluation in their head, a significant cognitive load.

Another challenge when debugging a spreadsheet formula is an error cascade. In an error cascade, one wrong formula can lead to errors propagating through the spreadsheet, including other formulas. These types of cascading errors make it more difficult to find the root cause of the problem.

Additional factors make it difficult to debug spreadsheet formulas. Some built-in functions, such as VLOOKUP, INDEX, or MATCH in MICROSOFT EXCEL, search for a particular value in a range of data and return a related value. For example, if one column contains names and an adjacent column contains phone numbers, VLOOKUP may be used to obtain a phone number for a particular name. However, it is difficult to identify where a returned value is being retrieved from because the search function is opaque, particularly if the arguments are themselves computed by a formula.

Another challenge faced when diagnosing errors in a spreadsheet is visualizing data that appears off-screen. For example, cell range Z200:Z250 referenced in cell B2 is not immediately visible. It's difficult to identify and rectify errors if referenced data is not visible on screen at the same time. Without effective solutions to this problem users will often scroll back and forth to view different sections of the spreadsheet, but this is tedious and inefficient.

Usability studies have shown that users spend significant amounts of time debugging spreadsheet formulas. See "Spreadsheet comprehension: Guesswork, giving up and going back to the author." In Proceedings of the 2021 CHI Conference on Human Factors in Computing Systems, pp. 1-21. 2021. In addition to the human cost, inefficiently debugging a formula consumes excess computing resources. For example, inefficiently finding the source of an error may result in multiple recalculations of the spreadsheet, consuming additional processor time and battery life.

It is with respect to these and other considerations that the disclosure made herein is presented.

SUMMARY

Disclosed are novel approaches to debugging a formula in a spreadsheet environment. An execution trace shows step-by-step how a formula is evaluated. Instead of overwhelming users by displaying a step for every atomic evaluation, multiple evaluations are displayed in the same step. This makes the execution trace compact yet intuitive, enabling users to quickly and efficiently understand how the formula is evaluated. Visualizing formula execution in this way also reduces the computing and energy costs of excess recalculations incurred by trial-and-error based debugging techniques.

In some configurations, a stepped view of formula evaluation intelligently selects multiple atomic operators to be evaluated within a single step. A step may include operators from a single subtree of the formula. A step may also depict simultaneous evaluation of parallel subtrees. In some configurations, when one formula invokes a sub-formula, a recursive formula trace displays a stepped view of the sub-formula.

In some configurations, the stepped view of formula evaluation supports sub-formula error detection. Sub-formula error detection evaluates sub-expressions of a formula. When an error is identified in a sub-expression, an indication of the error is displayed proximate to the sub-expression. The stepped view leverages a functional paradigm to enable quickly locating sources of error. By relying on the purity of execution and immutability of data of functional programming, each of the sequential steps of execution are depicted at the same time. Displaying multiple sub-expressions at once enables a user to narrow down the cause of an error by focusing on the sub-expression that caused it, without having to explore the entire formula.

Also disclosed is a range preview system that displays data from a relevant range of cells. The range preview system intelligently elides and contextualizes data ranges for efficient visualization. The range preview system optimizes space utilization by selectively collapsing rows and columns. For example, rows and columns that are referenced by a formula may be selected for inclusion in the range preview. This conserves screen real estate while providing users with a concise overview of data ranges. The range preview system may also infer labels, providing context during formula interpretation by associating references with nearby headers or other descriptions.

In some configurations, range elision is a dynamic process that depends on runtime data provided by the spreadsheet debugger. For example, a parameter of a function may refer to a particular column based on a value in a cell. As the cell value changes during execution, the parameter targeted by the function changes, and so which columns are shown/elided may change in response.

One type of range elision is formula-aware range elision. Formula-aware range elision uses knowledge about a formula to determine which columns to show or to hide in a range preview. For example, the VLOOKUP function in MICROSOFT EXCEL is invoked with a range of cells to search through, a value to find, and a target column. VLOOKUP looks through the first column of the range for the row that contains the value. It returns the value from the target column of that row. Formula-aware range elision may use knowledge of these parameters to include the first column and the target column of the range, while eliding other columns.

Range previews may also provide formula-aware text explanations. Formula-aware text explanations use knowledge of formula parameters to label a column displayed in the range preview. For example, in the context of VLOOKUP, the target column is identified with a numeric index, not the name of the column. One formula-aware text explanation uses knowledge of the VLOOKUP parameters to name the index parameter.

Range previews may also provide a neighborhood context. In response to a user selection of a range, e.g., in response to a user hovering over a range inside of a cell or inside of a formula, the range preview may include a contextual preview of the surrounding data grid. Since related information is often adjacent in the spreadsheet, providing the surrounding data grid in the range preview makes it easier to comprehend the range itself.

Also disclosed are techniques for inferring labels of formula references. Formula references refer to formula parameters as well as intermediate results displayed in the step-by-step execution trace discussed above. A formula reference may also be the result of a function call. More specifically, formula references are usually cell or range addresses, such as A1, B4:B10, $A$1:$A$10, C:C, Dept-Sales[[Sales Person]:[Region]], etc. Formula references may also be unaddressed, e.g. as in the target column of a VLOOKUP formula. Specific header detection algorithms may be used to infer a label for a formula reference. Machine learning models may also be applied to identify labels for formula references. Inferred labels may be applied in conjunction with range preview.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 8 is a flow diagram of an example method for stepped evaluation of a spreadsheet formula.

DETAILED DESCRIPTION

Figure 1:
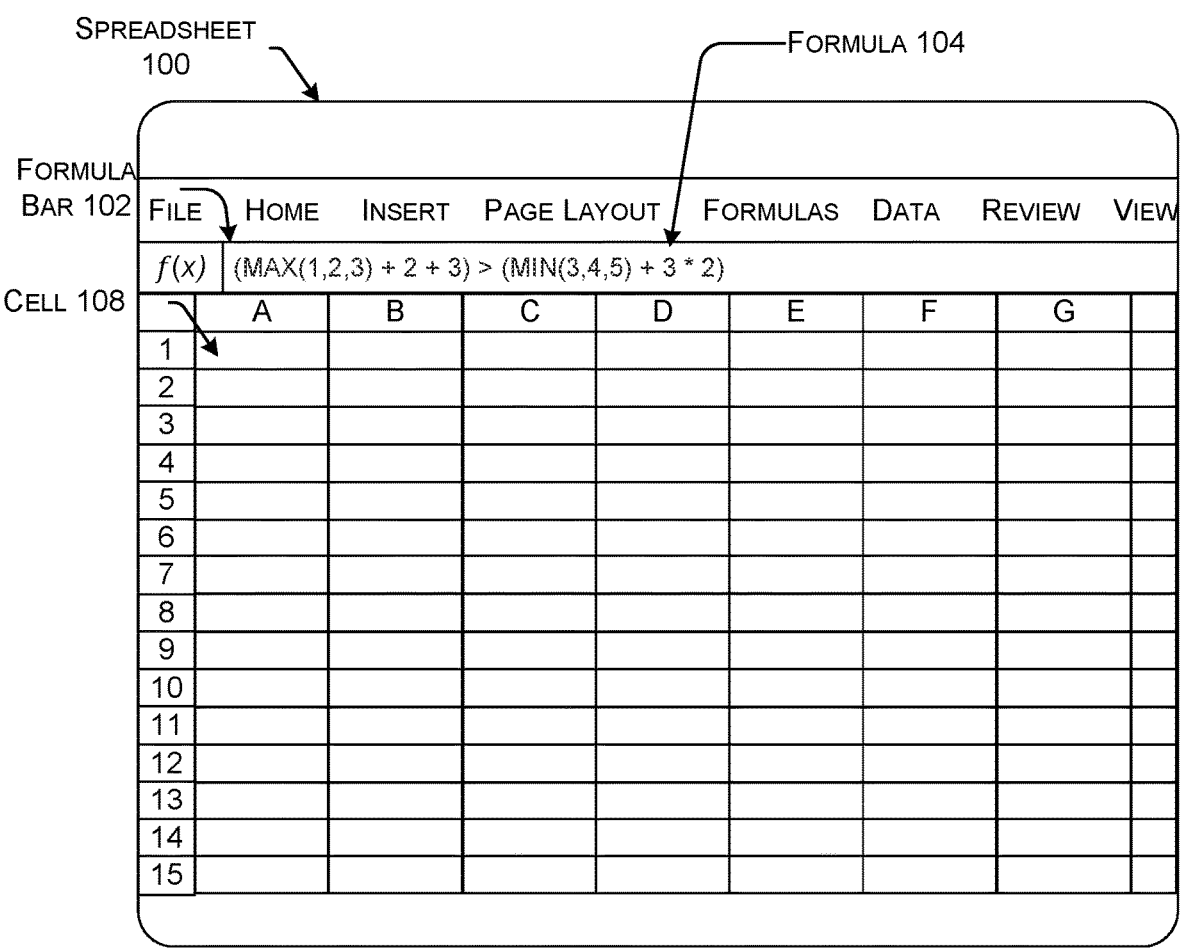
FIG. 1 illustrates a spreadsheet application with a formula bar.

FIG. 1 illustrates a spreadsheet application 100 with a formula bar 102. Formula bar 102 illustrates a formula 104 found in one of cells 108. Spreadsheet formulas are the backbone of powerful spreadsheet tools like Microsoft Excel, Google Sheets, or Apple Numbers, allowing users to perform calculations, manipulate data, and carry out complex tasks automatically. While specific features may vary, most implementations of spreadsheet formulas support basic mathematical operations $(+, -, \times, +)$, the ability to call built-in functions such as SUM and AVERAGE, cell references (A3), range references (C1:H10), and the ability to invoke other user-defined formulas.

Figure 2:
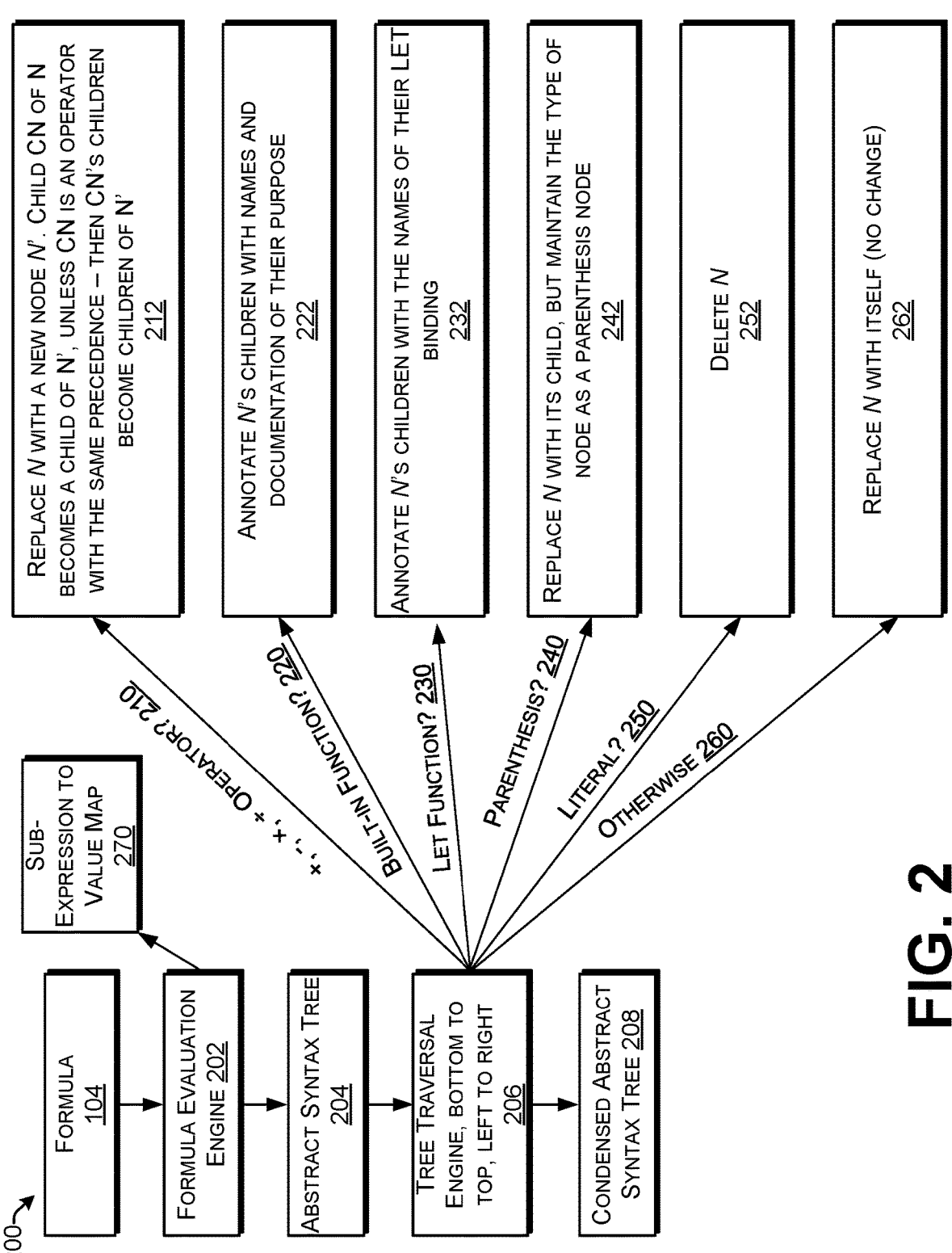
FIG. 2 illustrates an algorithm for traversing an abstract syntax tree representation of a formula.
Figure 3A:
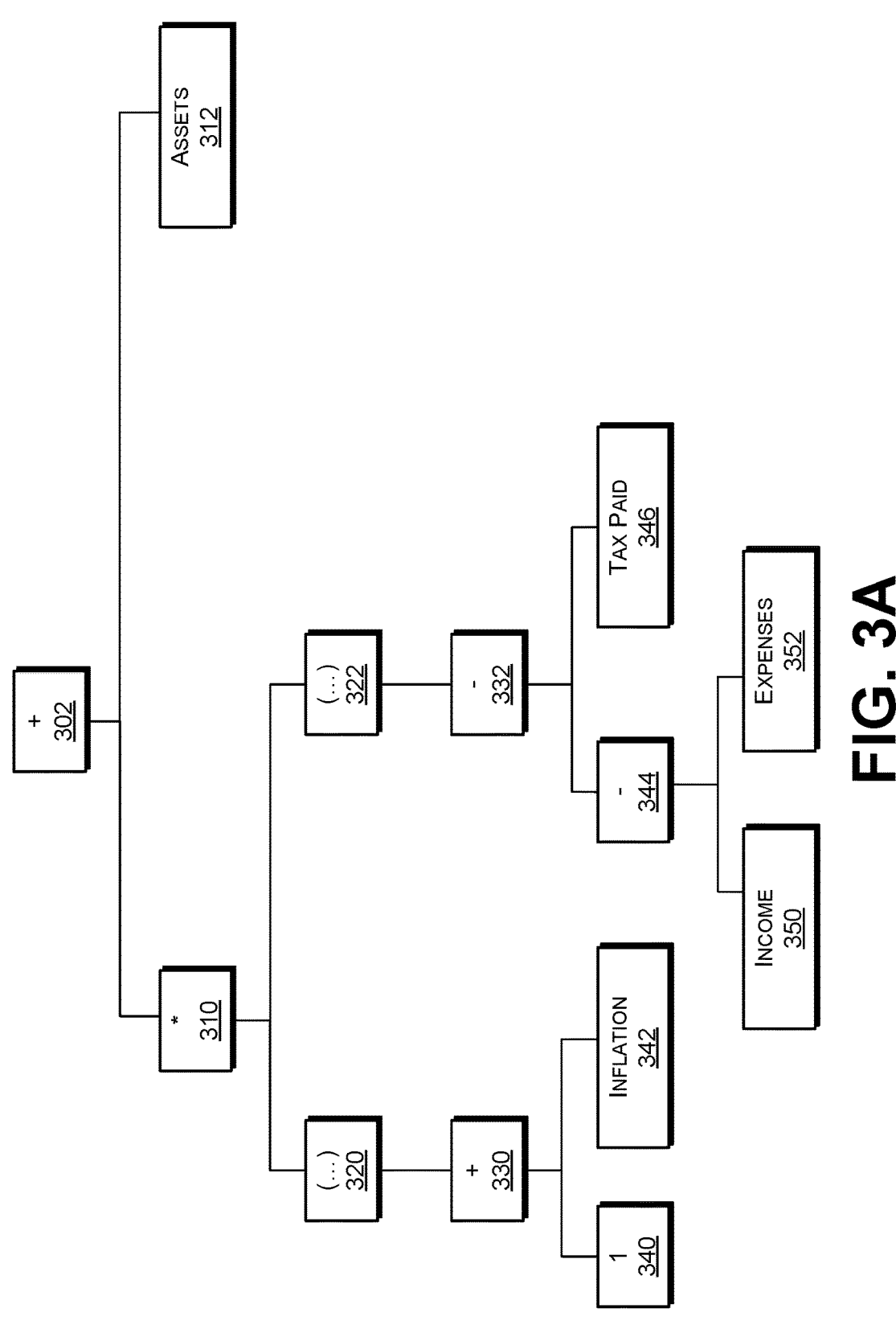
FIG. 3A illustrates one example abstract syntax tree representation of a formula.

FIG. 2 illustrates an algorithm 200 for traversing an abstract syntax tree representation of a formula. In some configurations, formula evaluation engine 202 receives formula 104 and parses it into abstract syntax tree 204. Formula evaluation engine 202 may construct abstract syntax tree 204 with any type of parser known in the art, including a recursive descent parser or a parser-generator derived parser. Abstract syntax tree 204 represents formula 104 as a tree, where each sub-expression of the formula is represented as a node in the tree and the parameters of a sub-expression are child nodes of that sub-expression. An example of an abstract syntax tree is depicted in FIG. 3A.

Formula evaluation engine 202 may also determine the values of sub-expressions of formula 104. For example, formula evaluation engine 202 may iteratively invoke a formula engine provided by spreadsheet 100, one sub-expression at a time, to obtain the value of each sub-expression of formula 104. In some configurations a node valuation traversal of abstract syntax tree 204 is performed, such as a depth first traversal, evaluating sub-expressions as they are encountered.

For example, the following execution trace of the formula "(MAX(1,2,3)+2+3)>(MIN(3,4,5)+3*2)" shows a systematic evaluation of formula 104. Each line of the trace illustrates the formula after evaluating a single sub-expression. The comment at the end of each line indicates the sub-expression that is evaluated on that line. The results of some sub-expressions may become parameters to other sub-expressions:

```
(MAX(1,2,3) + 2 + 3) > (MIN(3,4,5) + 3 * 2)    // MAX(1,2,3) => 3
(3 + 2 + 3) > (MIN(3,4,5) + 3 * 2)             // 3 + 2 => 5
(5 + 3) > (MIN(3,4,5) + 3 * 2)                 // 5 + 3 => 8
8 > (MIN(3,4,5) + 3 * 2)                       // MIN(3,4,5) => 3
8 > (3 + 3 * 2)                                // 3 * 2 => 6
```

5

-continued

```
8 > (3 + 6)                    // 3 + 6 => 9
8 > 9                          // 8 > 9 => FALSE
FALSE
```

The result of each sub-expression may be stored in sub-expression to value map 270. In this way, sub-expression to value map 270 stores each sub-expression and the value it evaluates to. For example, MAX(1,2,3) is the first sub-expression to be evaluated. Sub-expression to value map 270 stores this sub-expression and an indication that it evaluates to '3'. These mappings allow the values of any sub-expression to be retrieved for display as part of the stepped evaluation. Sub-expressions may include mathematical operations, parenthesis, calls to built-in functions, calls to other user-defined formulas, etc.

Tree traversal engine 206 performs a modification traversal on abstract syntax tree 204 to generate condensed abstract syntax tree 208. Condensed abstract syntax tree 208, as discussed in more detail below, identifies relevant sub-expressions to evaluate in each step of the evaluation.

In some configurations, tree traversal engine 206 processes abstract syntax tree 204 bottom to top and left to right. This means that nodes furthest from the root of the tree are processed first, and that nodes a same distance from the root are processed from left to right. Once the nodes that are furthest from the root have been processed, nodes that are the next-closest to the root of the tree are grouped together and processed left to right. This process of grouping nodes based on a distance from the root and processing them from left-to-right continues until all nodes of abstract syntax tree 204 have been processed. Other tree-traversal algorithms are similarly contemplated, such as depth first, breadth first, right-to-left, top-to-bottom, or a combination thereof.

For each node N in the modification traversal of abstract syntax tree 204, determinations 210, 220, 230, 240, and 250 are evaluated in sequence to determine if node N satisfies any of them. If one of these determinations evaluates to true, the corresponding operation 212, 222, 232, 242, or 252 is applied to node N. If none of determinations 210, 220, 230, 240, or 250 evaluate to true, then the "otherwise" branch 260 is taken and operation 262 is performed. These determinations and corresponding operations are illustrative and non-limiting.

Determination 210 is true when node N is an operator, such as +, −, ×, ÷. When determination 210 is true, operation 212 is applied to node N. Specifically, N is replaced with a new node N'. Children of N become children of N' unless a child of N is itself an operator with the same precedence. When formula 104 is represented as abstract syntax tree 204, adjacent operators of formula 104 have a parent-child relationship in abstract syntax tree 204. For example, in the expression "2*A3/5", the "/" operator may be a parent of the "*" operator, since the result of 2*A3 is a parameter to /5. When N and the child of N have the same precedence, both operators may be evaluated as part of the same step, condensing multiple operations into a single logical operation. This may be accomplished by making the children of the child of N children of N', condensing them into a single sub-expression. Abstract syntax tree 204 is modified in this way in order to better visualize different steps of evaluation—the purpose of condensed abstract syntax tree 208 is visualization, not computation.

Determination 220 checks whether node N invokes a built-in function, such as SUM( ) or AVERAGE( ). When determination 220 is true, operation 222 may utilize argument-specific information about the built-in function. For example, operation 222 annotates N's children—the arguments of the built-in function—with names or descriptions. These annotations may be viewed while displaying the steps of evaluation, as discussed below in conjunction with FIG. 5.

Determination 230 checks whether node N is a LET function. A LET function enables the user to define and initialize a variable before using the variable in an expression. For example, =LET(x, 5, y, 10, x+y) defines the variable x to be 5 and the variable y to be 10 before evaluating the expression "x+y". When determination 230 is true, operation 232 annotates node N's child nodes—and in particular any child nodes that contain expressions that use one of the variables introduced by the LET function-with the names of their LET bindings.

Determination 240 checks whether node N is the parenthesis expression. The parenthesis expression overrides the default order of operation, or may be used to add clarity to an expression. When determination 240 is true, operation 242 replaces node N with its child node, but this child node becomes a parenthesis node. This reduces the number of nodes in abstract syntax tree 204, and reduces the depth of abstract syntax tree 204, simplifying the visualization of stepped evaluation. Parenthesis can be in effect removed from abstract syntax tree 204 in this way because their operation is often superfluous to understanding a formula. For example, "x+y" is more understandable than "(x+y)" or "(x+ (y))".

Determination 250 checks whether node N is a literal value, such as a number of a string of text. When determination 250 is true, operation 252 deletes node N. Literal values can be removed from the condensed abstract syntax tree 208 because these values are incorporated into the values stored in the sub-expression to value map 270.

If none of determinations 210, 220, 230, 240, or 250 are true, the "otherwise" 260 path is taken to apply operation 262. Operation 262 replaces N with itself, such that node N does not change.

FIG. 3A illustrates one example abstract syntax tree representation 300 of a formula $$= (1 + \text{Inflation}) * (\text{Income} - \text{Expenses} - \text{TaxPaid}) + \text{Assets}.$$

Operator '+' 302 is at the root of the tree, and performs the final addition of the "(1+Inflation)*(Income−Expenses−TaxPaid)" sub-expression 310 and the "Assets" 312 sub-expressions. While Assets 312 is a terminal branch of tree 300, sub-expression 310 is itself computed by multiplying sub-expressions 320 and 322, both of which represent parenthesis expressions. Specifically, operator 320 evaluates sub-expression 330, which adds together '1' 340 and the value of the "Inflation" variable 342. Operator 332 subtracts tax paid 346 from the result of sub-expression 344, which itself subtracts expenses 352 from income 350.

FIGS. 3B-3N illustrate traversing abstract syntax tree 204 to construct condensed abstract syntax tree 208.

Figure 3B:
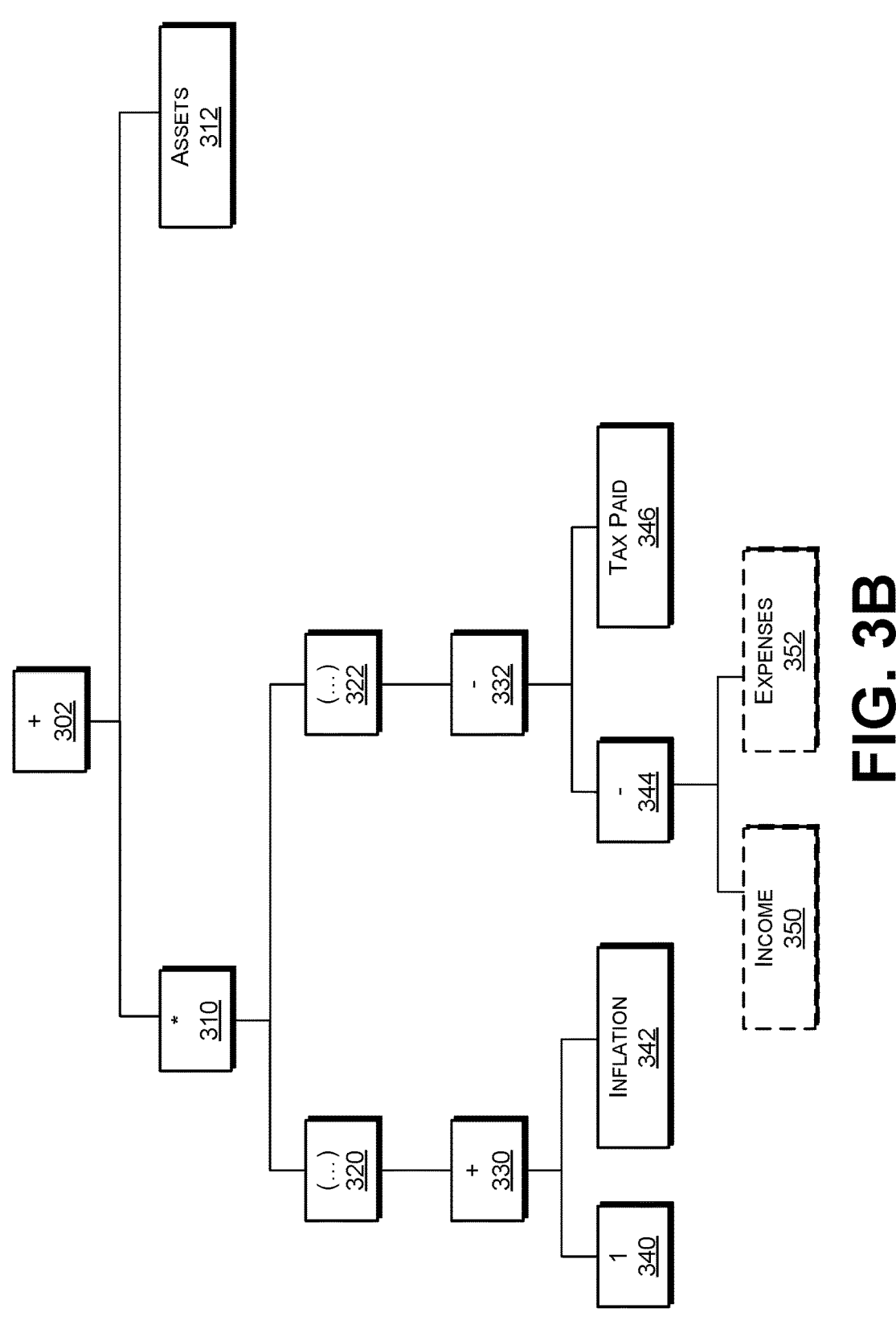
FIGS. 3B-3N illustrate traversing an abstract syntax tree to construct a condensed abstract syntax tree.

FIG. 3B illustrates visiting the bottom-most nodes 350 and 352, consistent with a bottom to top, left to right traversal. Nodes 350 and 352 are illustrated with dashed outlines to indicate that the traversal has reached them.

Specifically, neither of these nodes satisfy any of determinations 210-250. "Income" and "Expenses" represent variables, and as such do not represent an operator, a built-in function, a LET function, a parenthesis expression, or a literal value. As such, operation 262 will apply to both Income node 350 and Expenses node 352, and so both nodes will be left unchanged.

Figure 3C:
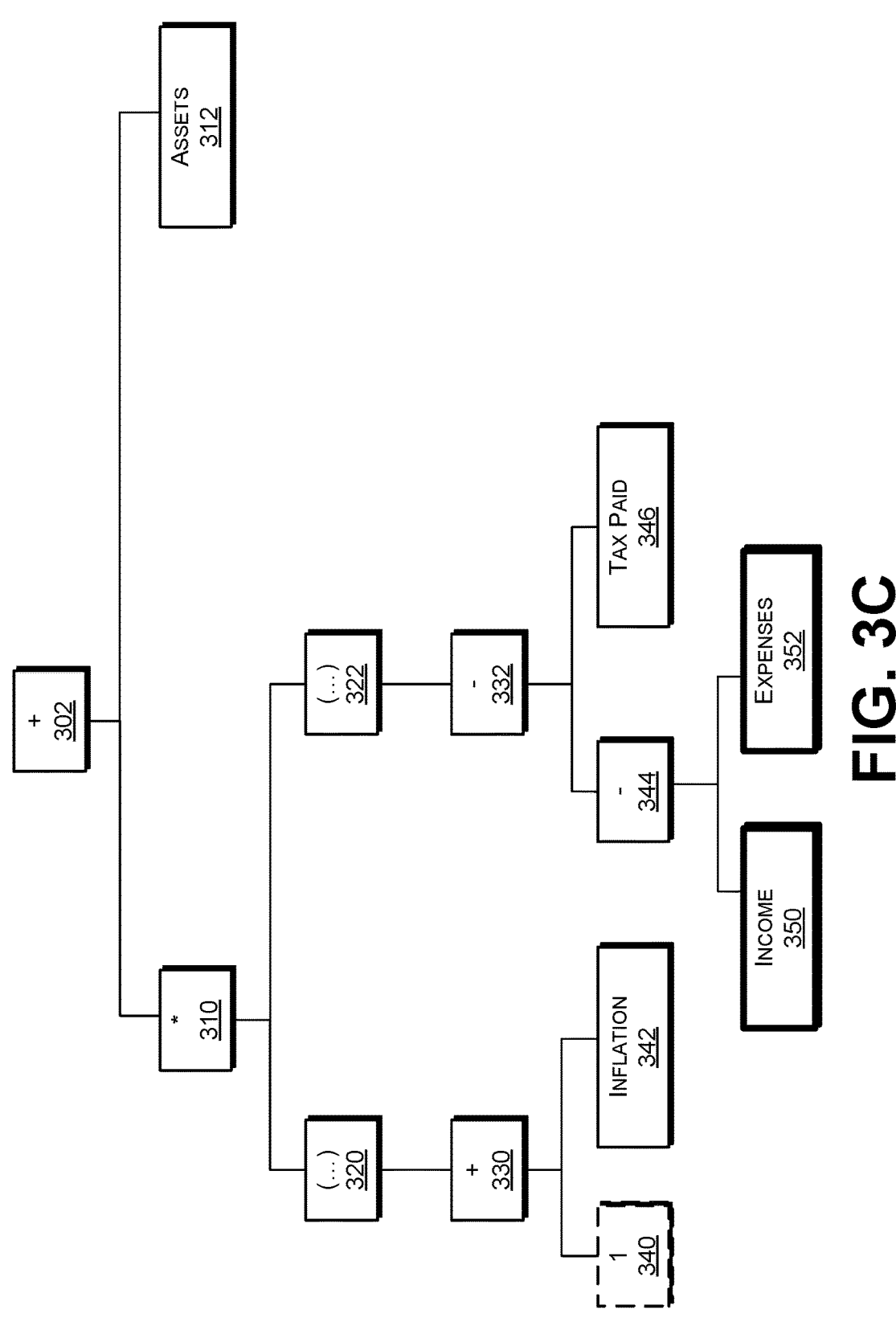

FIG. 3C illustrates that both Income 350 and Expenses 352 were not modified. Nodes 350 and 352 are drawn with a bold border to indicate that they have already been processed. Continuing the progression of bottom-up and left-right, FIG. 3C illustrates evaluating node 340. Node 340 contains a literal—the number '1'—and so it satisfies determination 250 and is removed from tree 300 by corresponding operation 252.

Figure 3D:
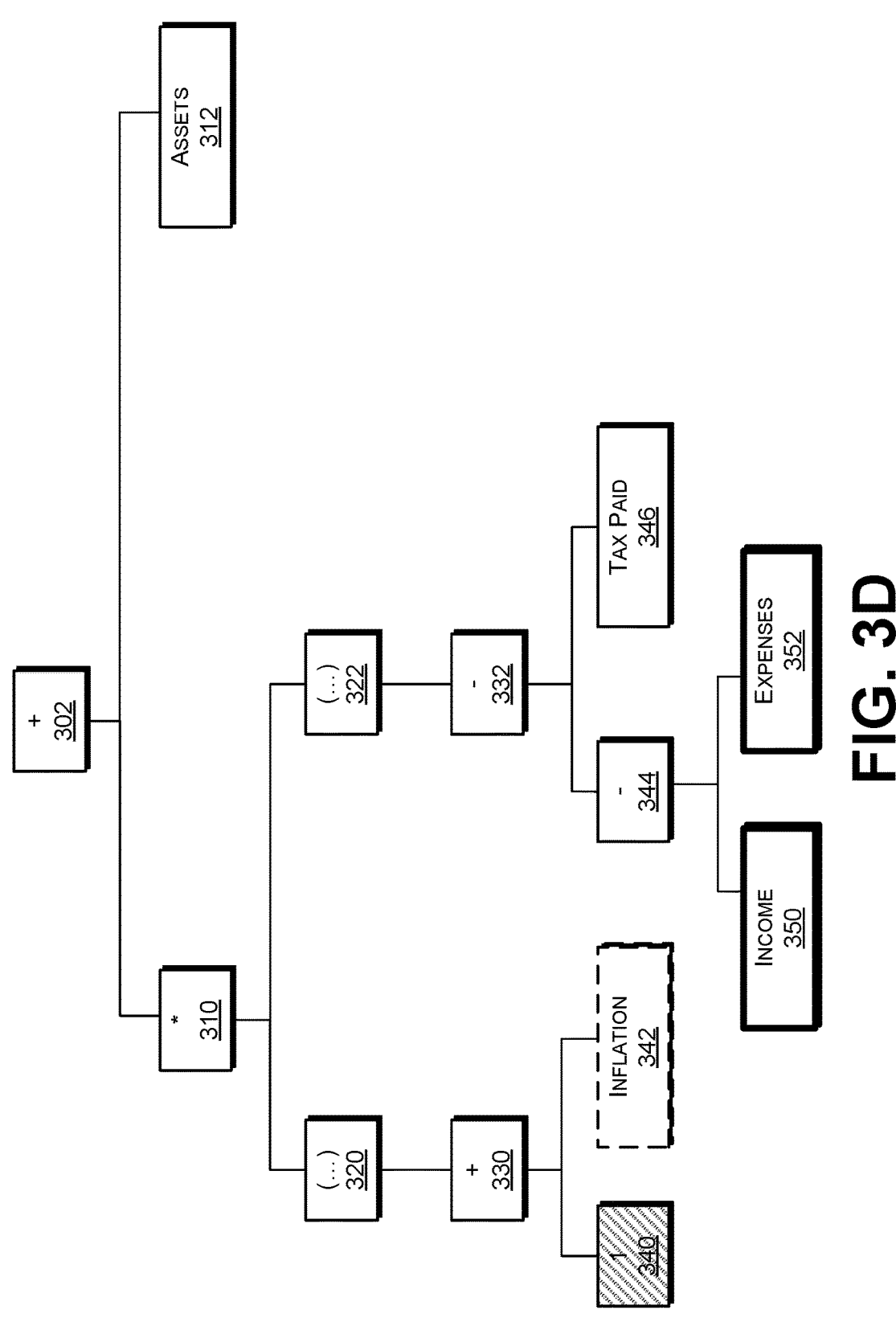

FIG. 3D illustrates with hashing that node 340—which represented the literal value '1'—has been removed from tree 300. At the same time, following the traversal of bottom-top, left-right, inflation node 342 is evaluated next. Similar to income and expenses nodes 350 and 352, inflation node 342 is a variable, and as such does not satisfy any of determinations 210-250. Therefore, it falls into the "otherwise" determination 260, and so operation 262 will leave inflation node 342 unchanged.

Figure 3E:
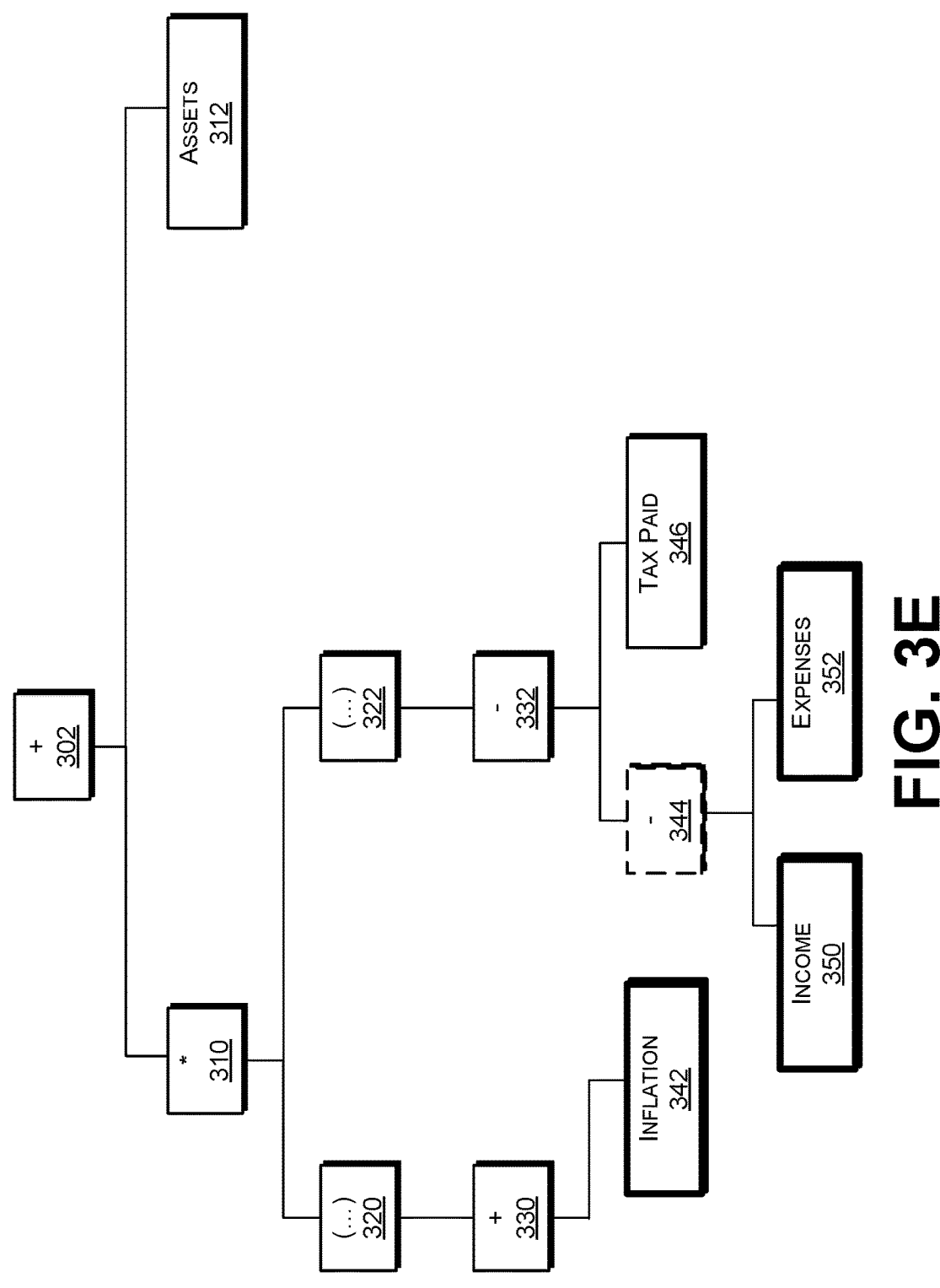

FIG. 3E illustrates that "Inflation" node 342 has been left unchanged. FIG. 3E also indicates that '-' operator node 344 will be evaluated next, continuing the bottom-up left-right traversal of abstract syntax tree 204. The '-' operator node 344 represents an operator, and so it satisfies determination 210, causing operation 212 to be applied.

Operation 212 replaces operator node 344 with a new node. The children of node 344 are divided into two categories-operator nodes that have the same precedent as the operator node 344, and anything else. In this case, neither income node 350 nor expenses node 352 are operator nodes, let alone operator nodes that have the same operator precedence as operator node 344, and so income node 350 and expenses node 352 are made children of the new operator node.

Figure 3F:
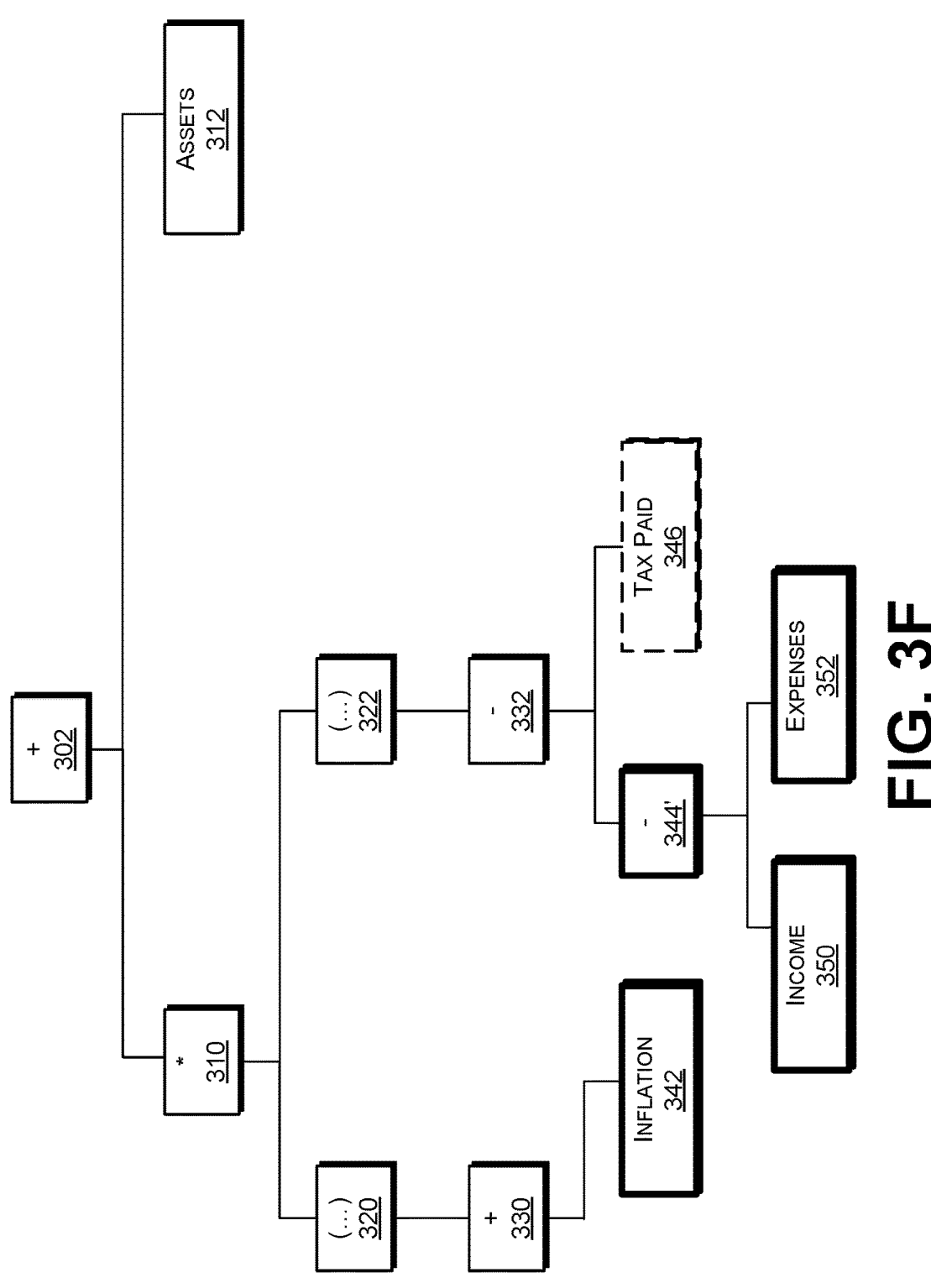

FIG. 3F illustrates that the '-' operator 344 was replaced with a new node 344'. The "Tax Paid" node 346, similar to Inflation node 342, fails to meet any of determinations 210-250, and so will be left unchanged by "otherwise" operation 262.

Figure 3G:
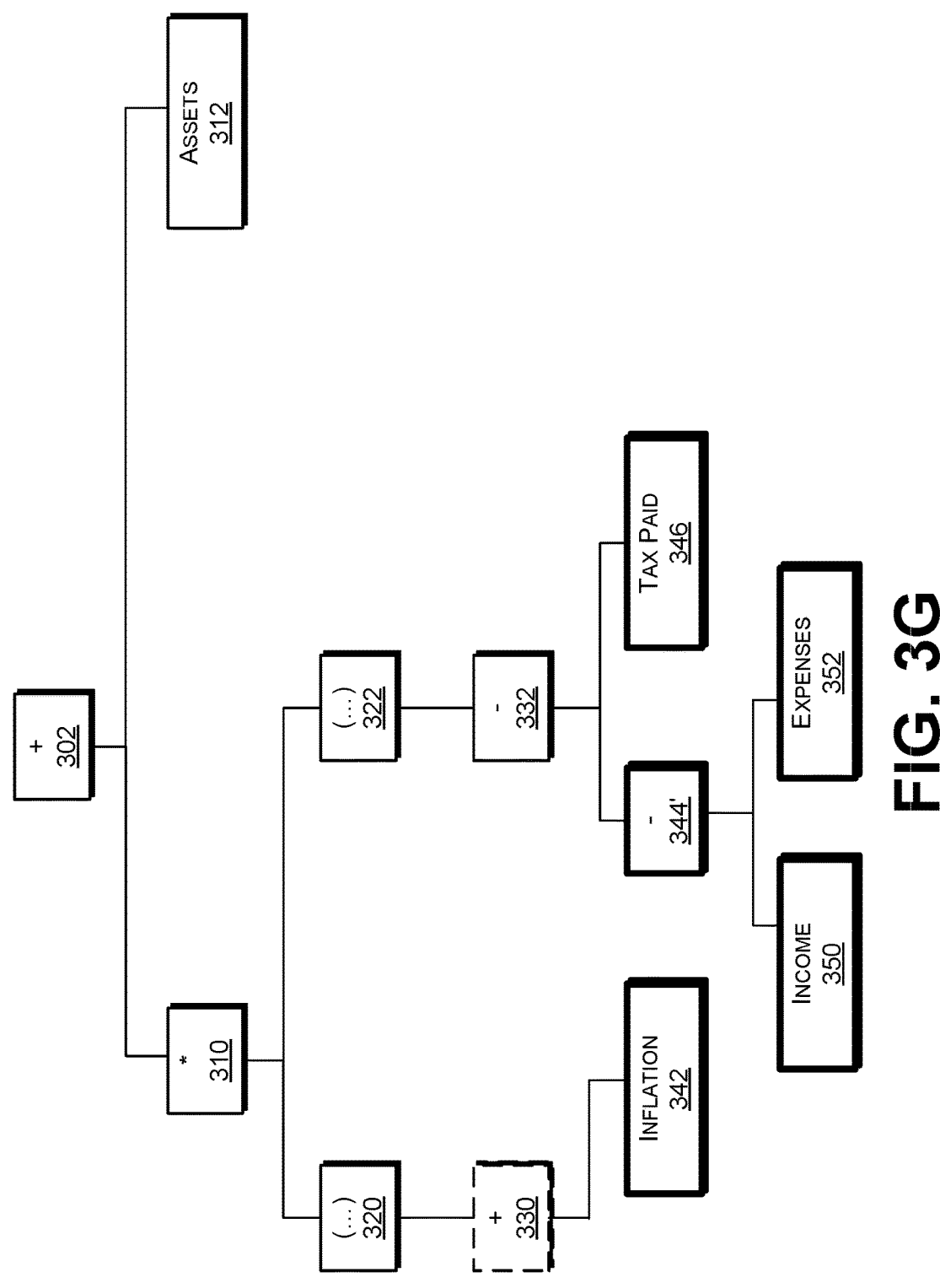

FIG. 3G illustrates beginning to traverse another layer higher, from left to right. '+' operator node 330 has one remaining child node, inflation node 342, after '1' node 340 was deleted as a literal value. Similar to '-' operator 344, '+' operator 330 does not have any children which are themselves operators with the same precedence. Throughout this document operators '-' and '+' are assumed to have the same precedence when evaluating a formula, as are operators 'x' and '÷'. Other operators are similarly contemplated.

Figure 3H:
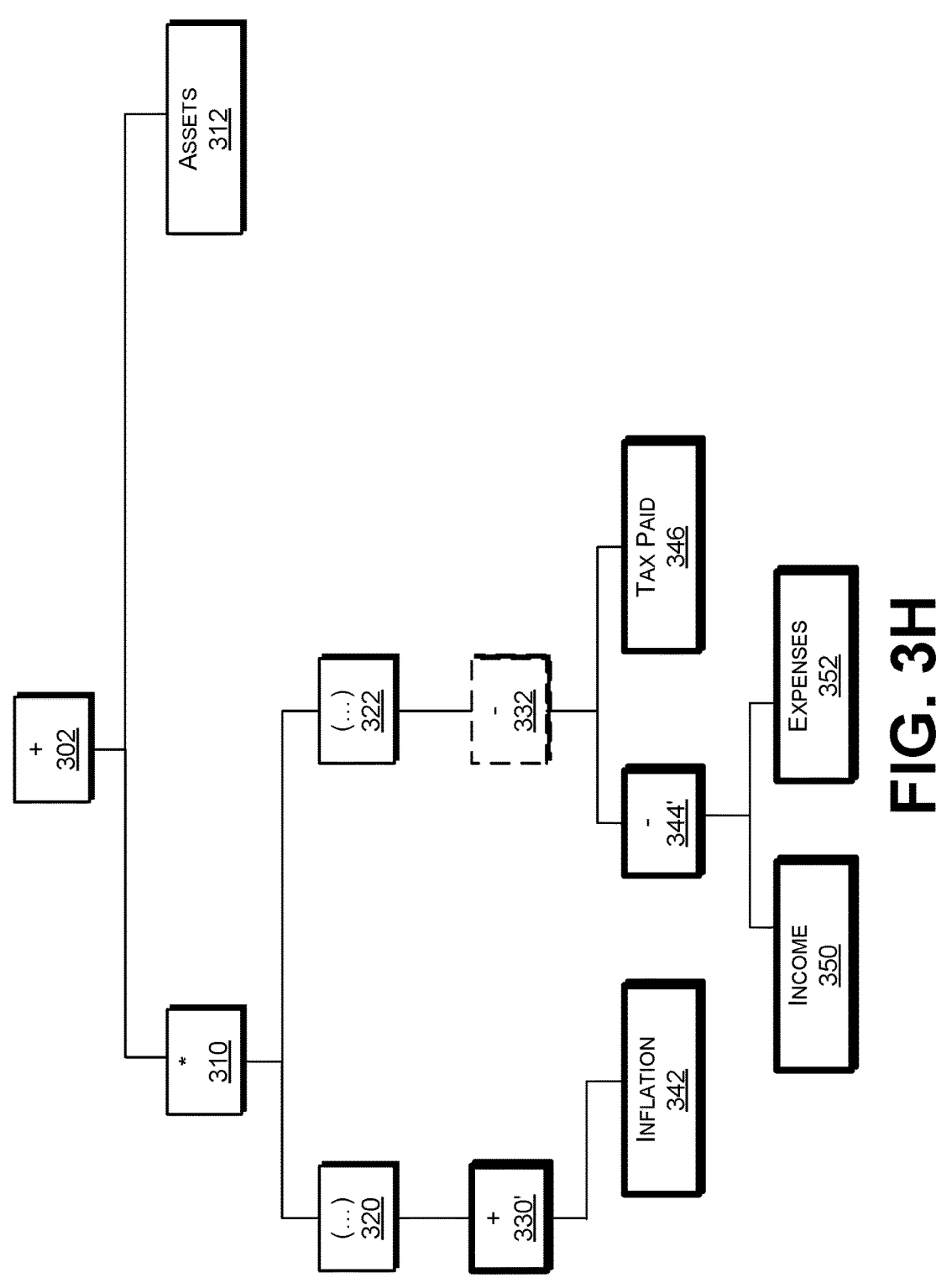

FIG. 3H illustrates processing '-' operator node 332. '-' operator node 332 satisfies determination 210, causing operation 212 to apply. Operation 212 replaces '-' operator node 332 with '-' operator node 332'. As discussed above, any children of an operator node that are not themselves operator nodes of the same precedence are added as children of the replacement node. However, when one of the children is itself a compatible operator node, like '-' operator node 344', then the child nodes of operator node 344' are also added as children to the '-' operator node 332'.

Figure 3I:
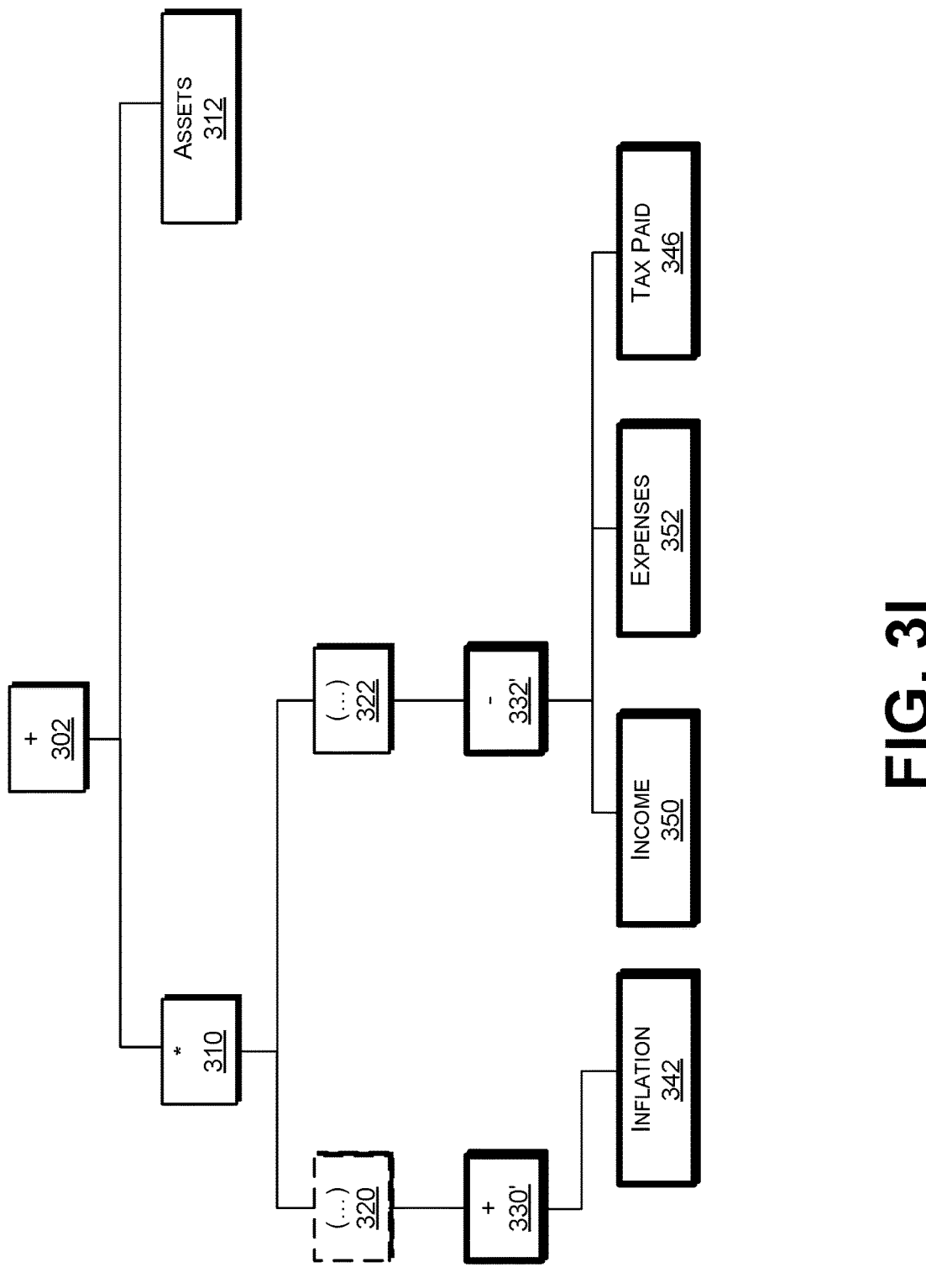

FIG. 3I illustrates new '-' operator node 332' with three children—income node 350, expenses node 352, and tax paid node 346. In this way, both subtraction operations will be displayed in the same step, saving the user time and reducing cognitive load. FIG. 3H also illustrates parenthesis expression 320 satisfying determination 240. Operation 242 replaces the parenthesis expression 320 with its child. However, the child node, in this case '+' operator 330', is assigned the node type of 'parenthesis'.

Figure 3J:
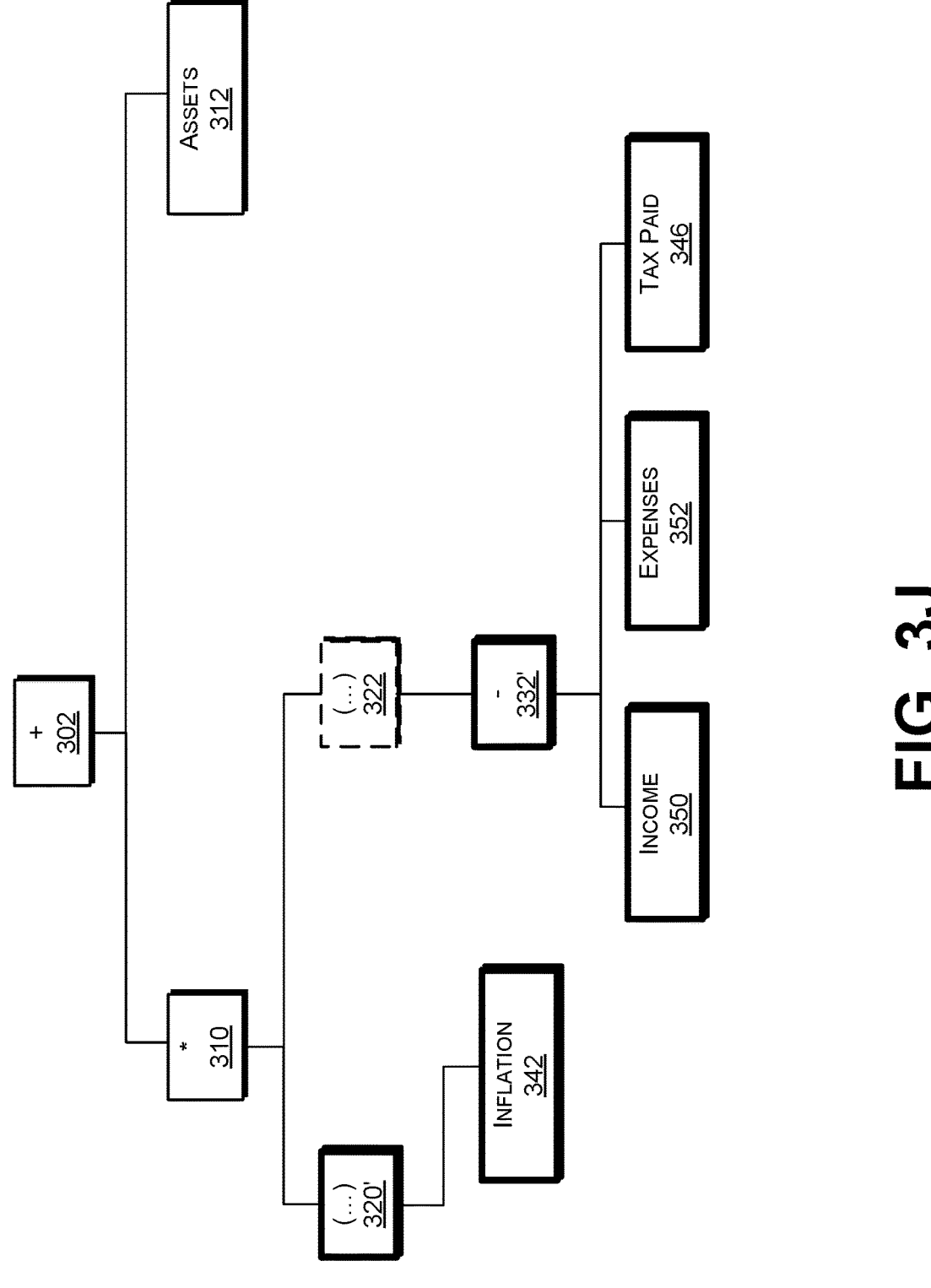

FIG. 3J depicts essentially the same operation applied to parenthesis node 322. FIG. 3J also depicts the replacement of node 320 with node 320'. Node 320' is the same as node 330'-it has child node 342—except instead of being a '+' operator it becomes a parenthesis operator.

Figure 3K:
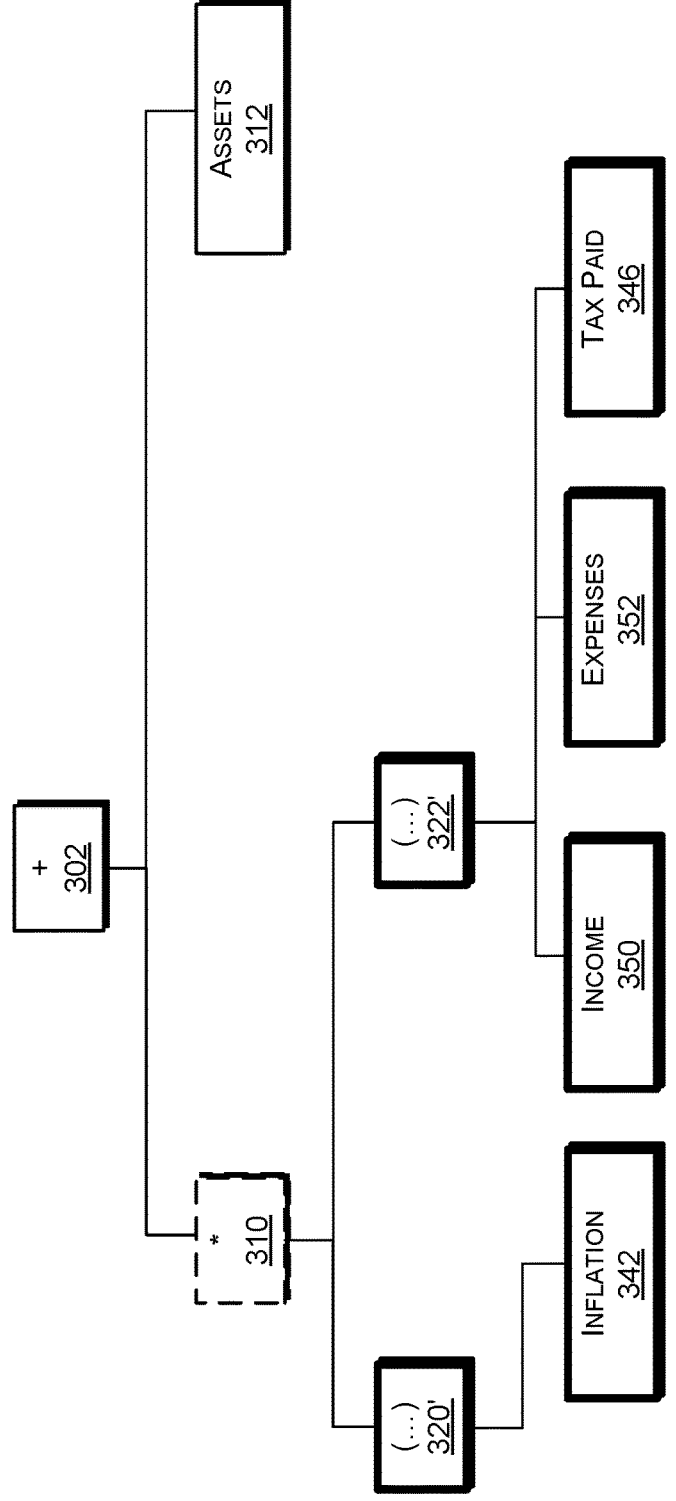

FIG. 3K illustrates applying '*' operator node 310. Having satisfied determination 210, operation 212 replaces '*' operator node 310 with '*' operator node 310'. Both children of node 310 (parenthesis nodes 320' and 322') remain the children of node 310'.

Figure 3L:
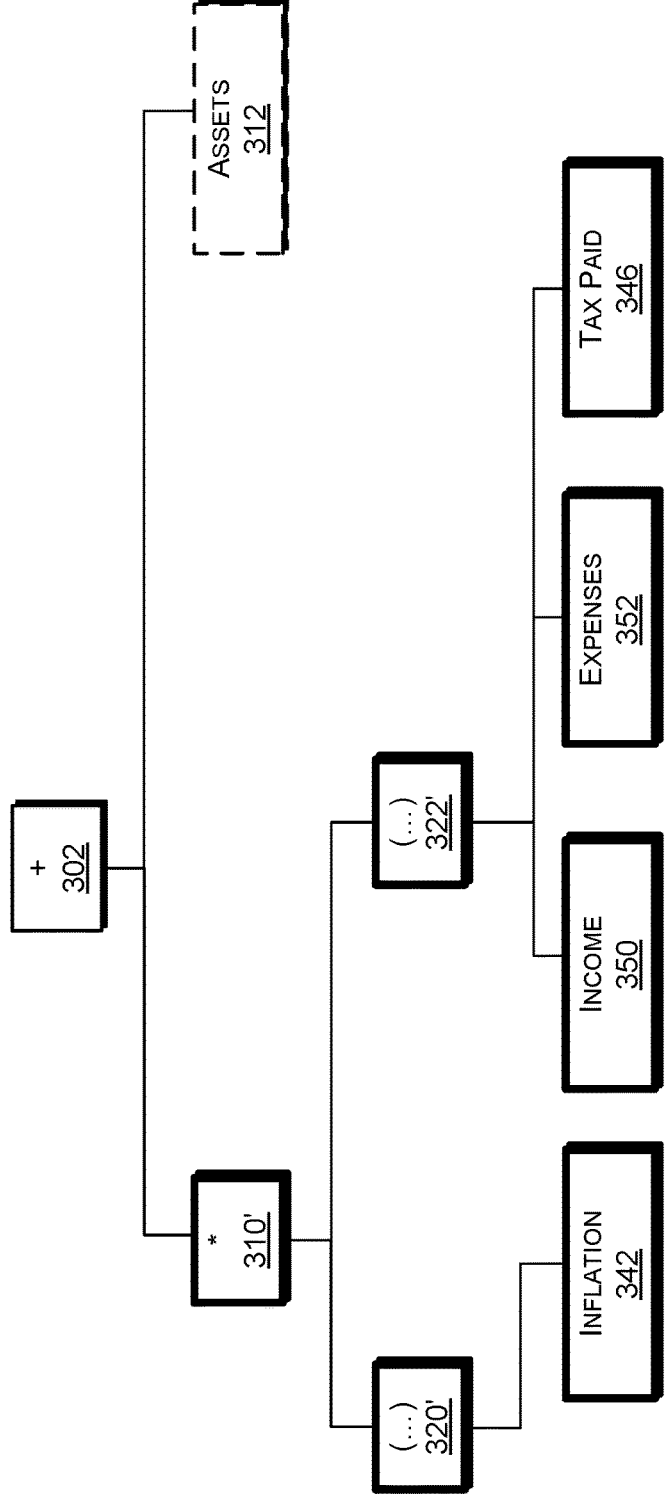

FIG. 3L illustrates applying operation 262 to assets node 312, similar to the application of operation 262 to income node 350 as discussed above in conjunction with FIG. 3B.

Figure 3M:
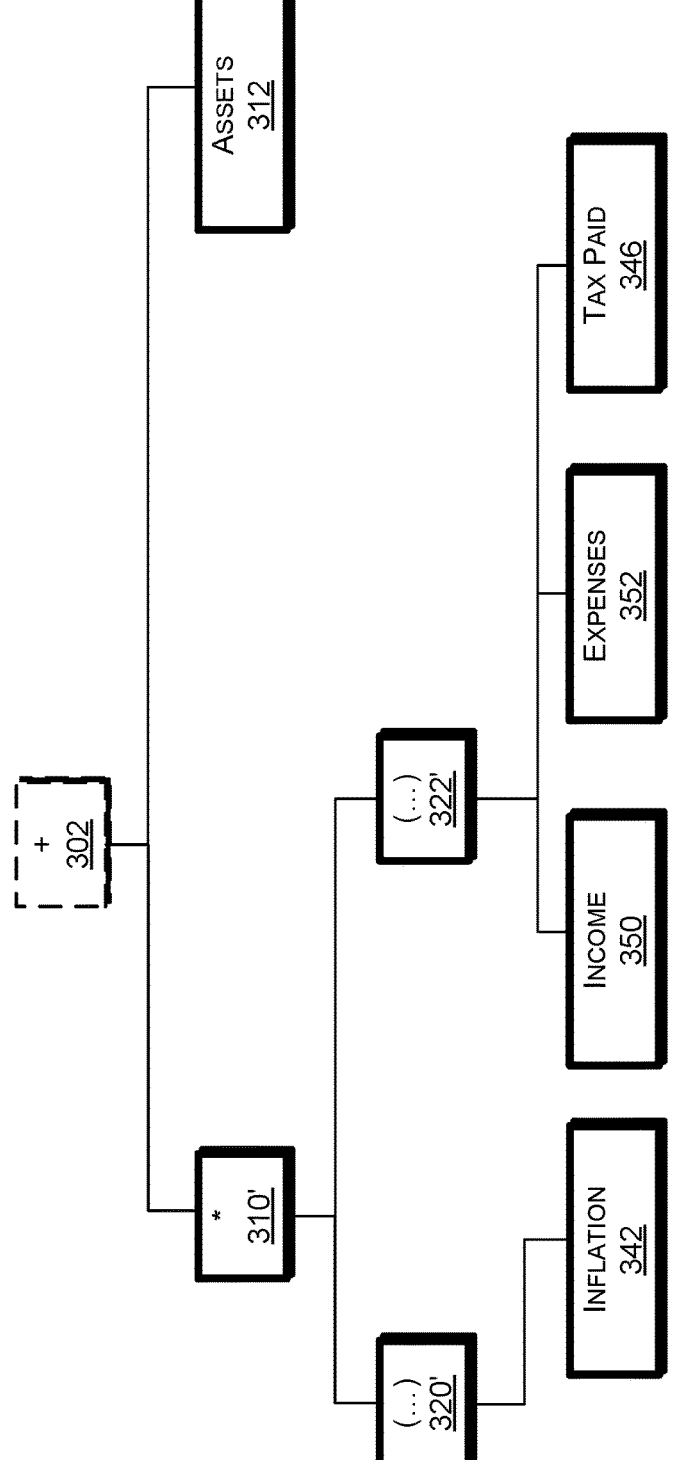
Figure 3N:
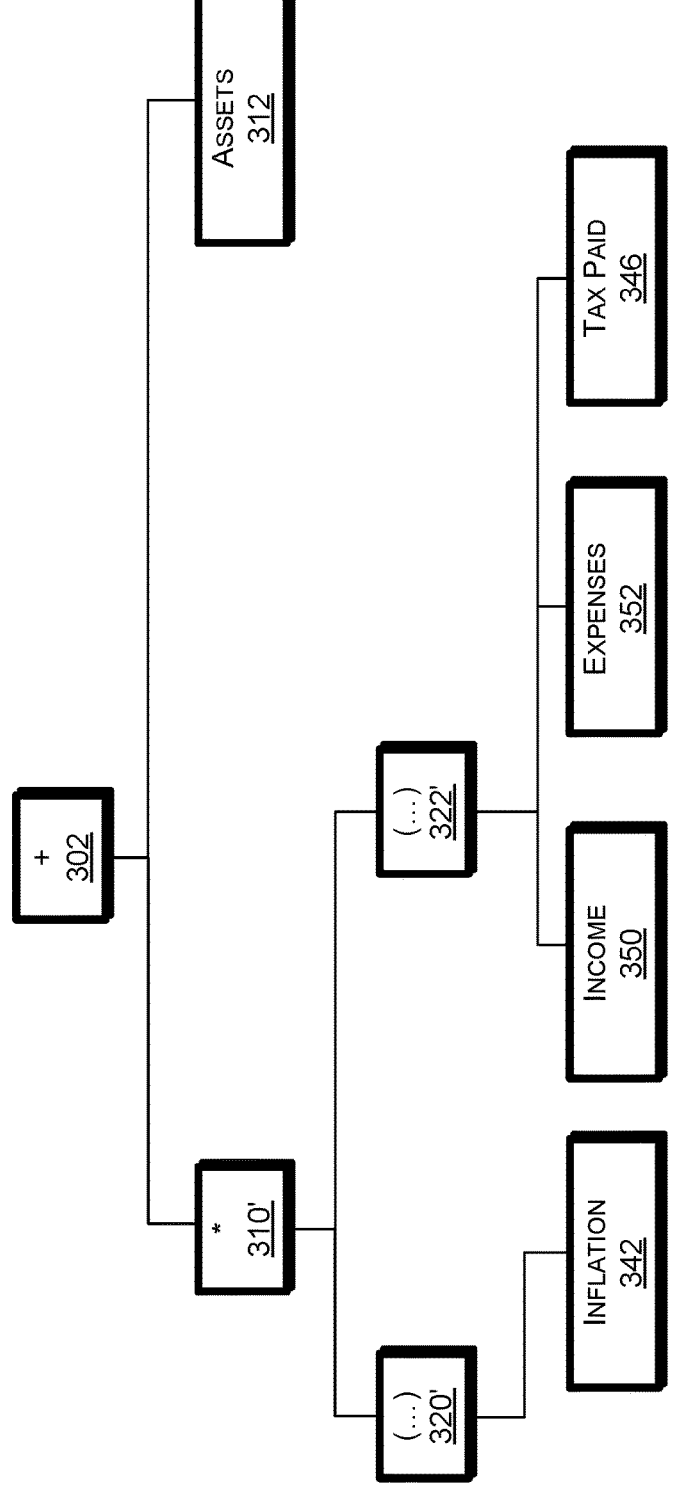

FIGS. 3M and 3N illustrate applying operation 212 to '+' operator node 302, similar to the application of operation 212 to '-' operator node 344 as discussed in conjunction with FIGS. 3E and 3F.

Figure 4:
FIG. 4 illustrates separating the condensed abstract syntax tree into steps.

FIG. 4 illustrates separating the condensed abstract syntax 208 tree into steps 421-424. In some configurations, a bottom-up traversal of the tree is performed, assigning nodes to steps in turn. Each node N is assigned to one step above the highest step of its children—$step_{Node} = \max(<step_{children})+1$.

For example, Expenses node 352 has no children, so "max $(<step_{children}>)$" is 0, and so expenses node 352 is assigned to step "0+1"=1. Node 322' does have a child node—three of them. Each has a step of 1. Therefore, "max $(<step_{children}>)+1$"="1+1"=step 2 for parenthesis node 322'.

When N's children are in different steps there is a "skipped step"-a step between N's step and the step that contains one of N's children. A skipped step is incomplete-it does not visualize all sub-expressions of formula 104. Specifically, a skipped step does not illustrate the child of N that appears in a step further from the root. To fill this gap, additional copies of the children in lower steps are inserted into the skipped steps. This ensures that the entire formula is represented in each step.

Assets node 312 has no children. It also has no ancestors in step 2 or step 3—these are skipped steps between assets node 312 (step 1) and '+' node 302 (step 4). According to the rule outlined above, assets node 312 is copied as assets node 412A and assets node 412B into the intervening skipped steps 2 and 3.

In some configurations, certain functions generate internal dependencies that are illustrated as additional steps. For example, in a formula such as "=LET(x, 1+2, y, x+3, y-4)", the subexpression "x+3" cannot be evaluated until the expression "x" has been evaluated. To accommodate these situations, the independent expression ("x" in this example) is placed on a separate step from the dependent expression ("x+3").

In some configurations, additional steps are not introduced for dependencies between the variable initializations of a LET binding—an additional step may still be used to between variable initializations and the body. When omitting steps between variable initializations, multiple variable initializations may be visualized in the same step. In some configurations, additional the steps of the LET binding that are not displayed initially may be revealed in response to a user selection of an expander.

The difference can be appreciated by the following example. The formula "=LET(x, 1+2*3, y, x+3+4, x+y) may have the following stepped evaluation. Each variable initialization expression is illustrated with a distinct step. Bold numbers highlight the result of a partial evaluation. The "←" indicates that a value is being bound to a variable:

$$= LET(x, 1 + 2 * 3, y, x + 3 + 4, x + y)$$

$$= LET(x, 1 + 6, y, x + 3 + 4, x + y)$$

$$= LET(x \leftarrow 7, y, x + 3 + 4, x + y)$$

$$LET\big(y, x{:}7 + 3 + 4, x{:}7 + y\big)$$

$$= LET(y \leftarrow 14, 7 + y)$$

$$= 7 + y{:}14$$

$$= 21$$

Omitting steps for dependencies between bindings, while adding an expander, reduces the number of steps:

$$= LET(\blacktriangleright x, 1 + 2 * 3, \blacktriangleright y, x + 3 + 4, x + y)$$

$$= LET(x \leftarrow 7, y \leftarrow 14, x + y)$$

$$= x{:}7 + y{:}14$$

$$= 21$$

Where activating the expander reveals steps similar to those illustrated above for variable initialization. For example, activating the leftmost ▶ reveals the following sub-steps:

$$= 1 + 2 * 3$$

$$= 1 + 6$$

$$= 7$$

Figure 5:
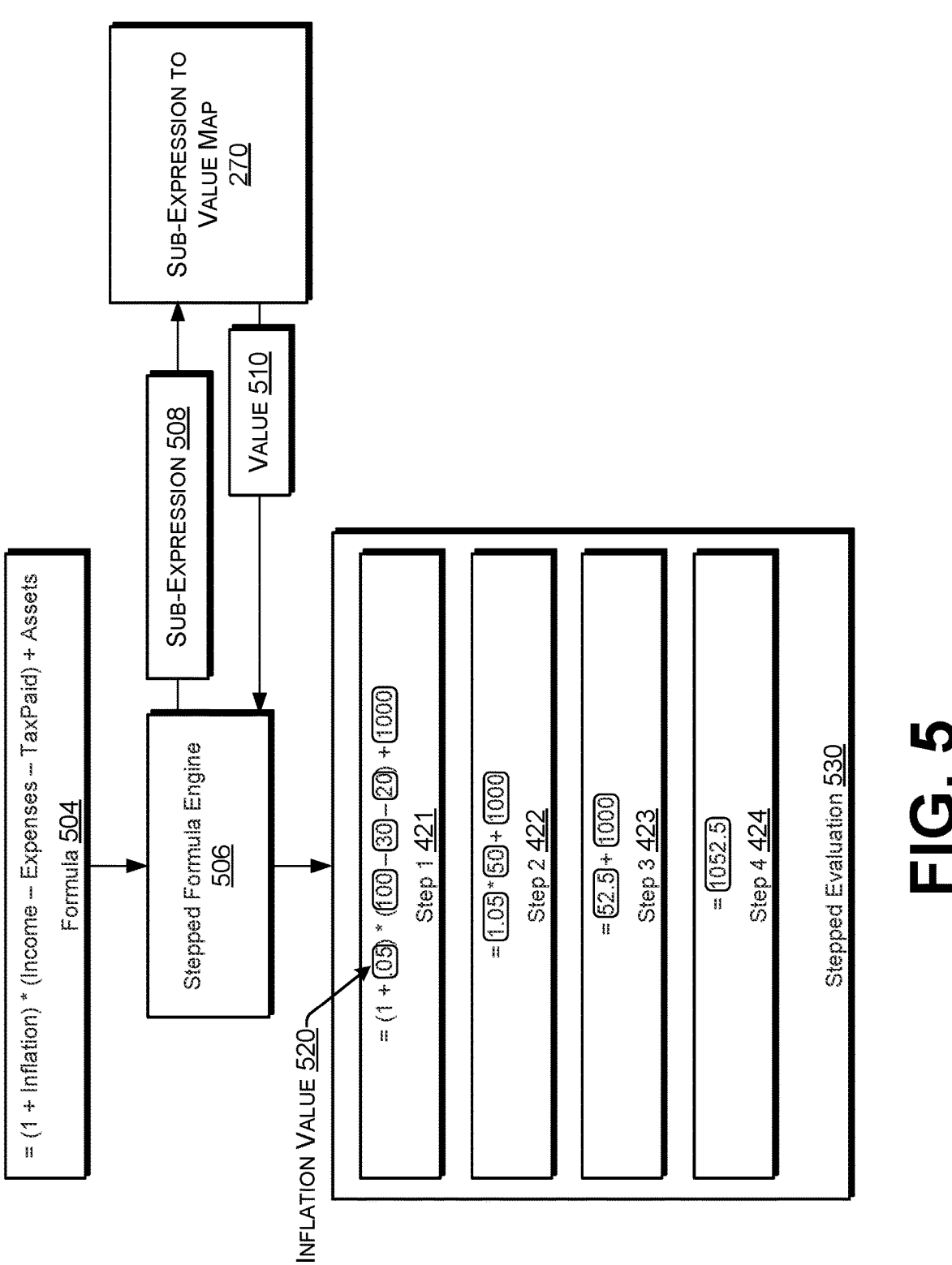
FIG. 5 illustrates stepped evaluation of a formula.

FIG. 5 illustrates stepped evaluation 530 of formula 504. Stepped formula engine 506 displays the original formula 104 followed by steps 421 through 424. This formula 104 and these steps 421-424 are examples, and any number of steps, as well as any subset of steps, are similarly contemplated.

Each step is displayed by starting with the original formula and replacing sub-expressions 508 found in that step with corresponding values 510 obtained from sub-expression to value map 270. For step 421, inflation 342 is a sub-expression 508 that is replaced with a corresponding value 520 of "0.05". Step 421 has other nodes 350, 352, 346, and 312, each of which is a sub-expression 508 that may be replaced with a corresponding value 510, e.g. "100", "30", "20", and "1000", respectively.

Similarly, step 422 is displayed with the original formula, but sub-expressions that encompass nodes 320' ("1+Infla-tion") and 322' ("Income—Expenses—Tax Paid") are replaced with the values of original corresponding nodes 320 and 322, e.g., "1.05" and "50" respectively. Node 412A ("assets") may also be replaced with the corresponding value for corresponding variable 312—"1000". Subsequent steps 423-424 are displayed in the same manner. Displaying steps in this way enables a user to visualize formula 104 at different points in the evaluation.

In some configurations, instead of replacing sub-expressions 508, values 510 are displayed in conjunction with sub-expressions 508, such as within parenthesis adjacent to the corresponding sub-expression. In other configurations, values 510 are placed in front of sub-expressions 508, which appear within parenthesis or other demarcation. In some configurations, sub-expressions 508 are displayed for each step while corresponding values 510 are displayed in a pop-up in response to hovering over a particular sub-expression.

Figure 6A:
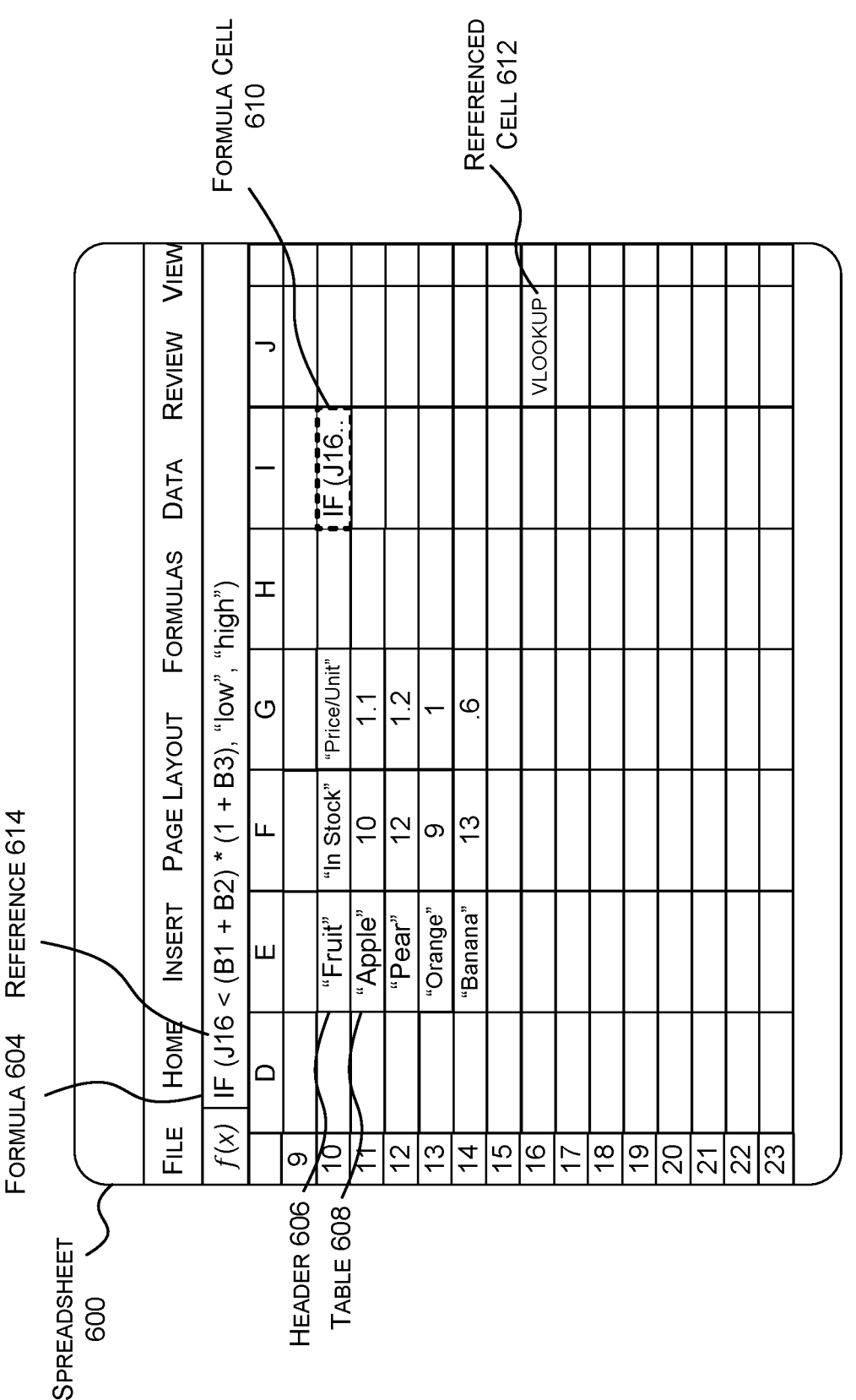
FIGS. 6A-6D illustrate an enhanced formula view and a range preview pop-up.

FIG. 6A illustrates spreadsheet 600 containing formula 604. Formula 604 appears in formula cell 610, cell "I10", and references various cells throughout spreadsheet 600 including referenced cell 612, cell "J16". Formula cell 110 is one example location of formula 604—any other cell, as well as any other place where a formula may appear in spreadsheet 600, is similarly contemplated. For example, formula 604 may appear in stepped evaluation 530 discussed above.

Formula 604 includes an "IF" function, a built-in function that accepts three parameters. The first parameter is a condition expression that is evaluated to true or false. The second and third parameters are expressions that are evaluated based on whether the condition expression was true or false, respectively. In this example, the condition expression is "J16< (B1+B2)*(1+B3)". If the result is true, then the IF function returns the "low" expression, while if the result is false the IF function returns the "high" expression. The IF function, the number and type of references, and the operators of function 604 are illustrative examples-other functions and references are similarly contemplated, as are invocations of other user formulas and other spreadsheet programming techniques.

Spreadsheet 600 also includes table 608, which appears over the range "E11:G14". The "E" column contains fruit names, the "F" column indicates a number of items in stock, and the "G" column indicates a price per unit. Header 606, which appears above table 608, includes descriptive text of each column of table 608, but is not itself a part of table 608. Table 608 is interchangeably referred to as a range throughout this document.

Figure 6B:
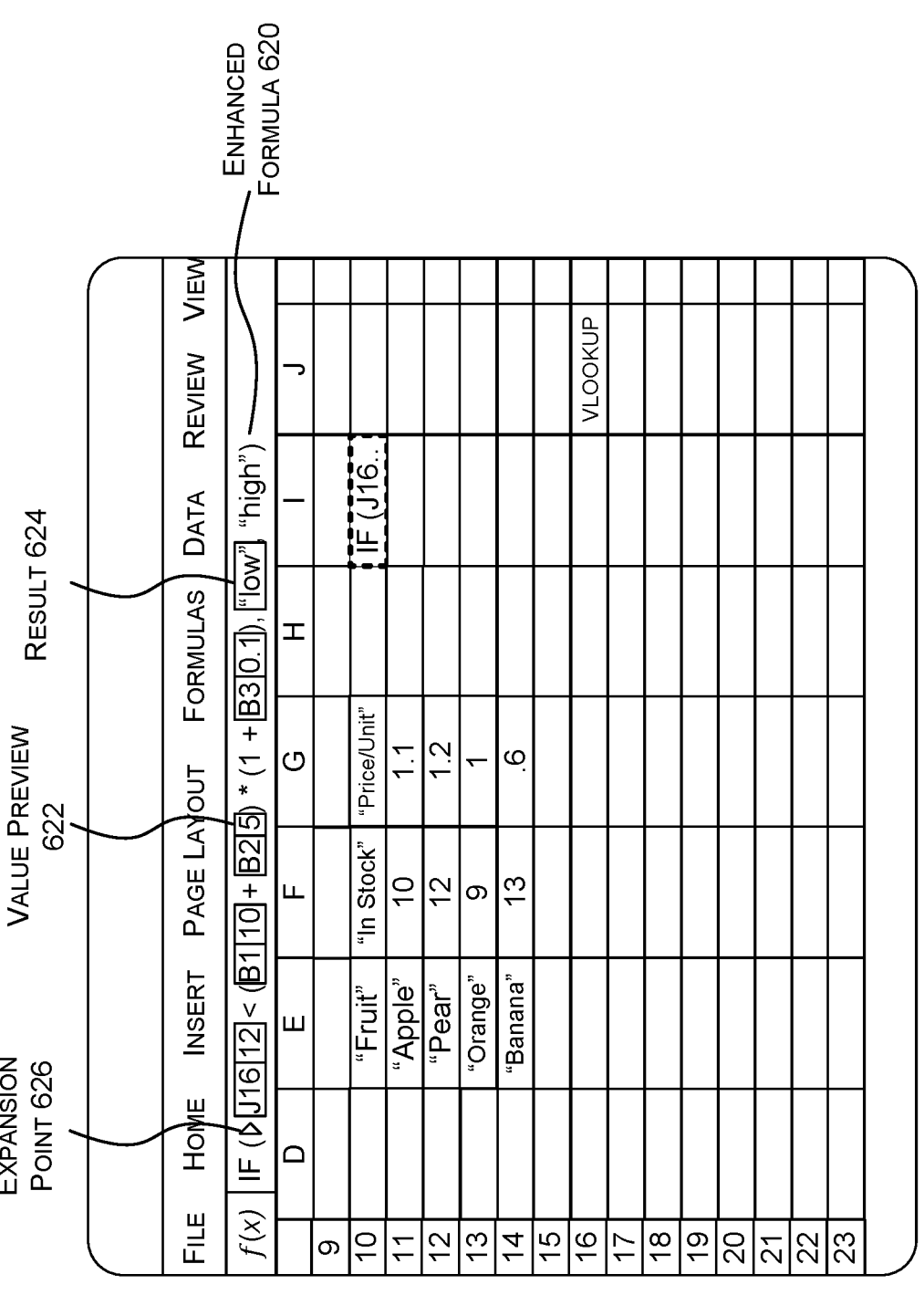

FIG. 6B illustrates enhanced formula 620-*a* visual augmentation of formula 604. Enhanced formula 620 displays value previews 622 for at least some of the referenced cells. For example, cell "B2" is determined to have or otherwise evaluate to "5", and so value preview 622 places "5" proximate to "B1". As illustrated, the association of "5" and "B2" is highlighted with adjacent boxes. These boxes may be distinguished visually from boxes surrounding other value previews by use of a distinct color. Displaying "5" adjacent to "B2" is just one example of how value preview 622 visualizes the value of a cell. In other configurations, the value "5" could appear in parenthesis after "B2", or "5" could appear in response to clicking on or hovering over "B2". References to cells J16, B1, and B3 similarly display a value preview.

Result 624 illustrates highlighting what formula 604 evaluates to. In some configurations, result 624 is identified based on a function-specific analysis that knows which parameters of a function are candidates to be the result of formula 604. As illustrated, "J16" has a value of 12, which is less than "(B1+B2)*(1+B3)"= "(10+5)*(1+0.1)"="15*1.1"=16.5, and so the condition evaluates to true. As such, result 624 highlights the second parameter, "low" of function 604.

Expansion point 626 appears proximate to the reference to cell "J16", indicating more can be learned about how cell "J16" is evaluated. In some configurations, referenced cells that contain a raw value, or which are otherwise determined to have less than a threshold amount of complexity, are not associated with an expansion point. When activated, expansion point 626 displays more detail about how cell "J16" was evaluated.

Figure 6C:
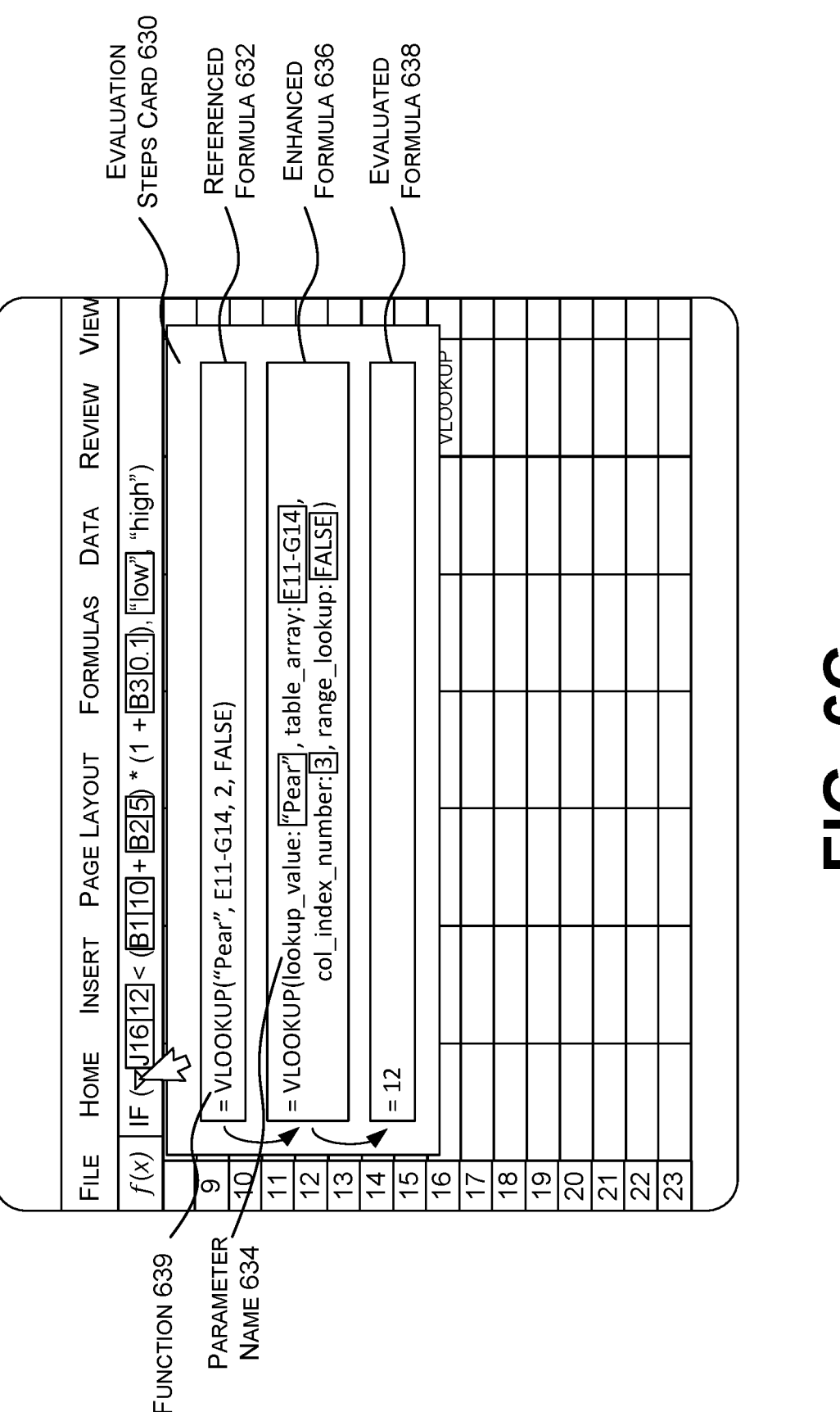

FIG. 6C illustrates evaluation steps popup 630, which illustrates additional detail on how cell "J16" is evaluated. Evaluation steps popup 630 may be displayed in response to invoking expansion point 626. Cell "J16" includes referenced formula 632, which invokes the VLOOKUP function. In this example, VLOOKUP scans a first column of a table to find the value "Pear", as indicated by the "lookup_value" parameter. The table is found in range E11-G14, as indicated by the "table_array" parameter. When "Pear" is found, VLOOKUP returns the value from the same row from the $2^{nd}$ column, as indicated by the "col_index_number" parameter.

Reference formula 632 displays the contents of cell "J16". Enhanced formula 636 depicts the formula contained in cell "J16" with formula-aware text, such as parameter names 634. In some configurations, parameter names 634 are obtained during the evaluation traversal of an abstract syntax tree 204 of the formula contained in cell "J16". In this example, parameter names are obtained from an API reference or other metadata store that describes the parameters of functions such as VLOOKUP. For example, the first parameter, "Pear", is annotated with the parameter name "lookup_value", while the remaining parameters are annotated with the names "table_array", "col_index_number", and "range_lookup".

Enhanced formula 636 may also provide an interactive UI widget proximate to the parameters or cell references of referenced formula 632. Activating this widget enables a user to discover more about the parameter/cell. For example, the "table_array" parameter, which is the range "E11-G14", is displayed with an interactive widget that enables the user to discover more about this range, as discussed below in conjunction with FIG. 6D.

Evaluated formula 638 displays a final value of formula 604. In this example the value is 12.

Figure 6D:
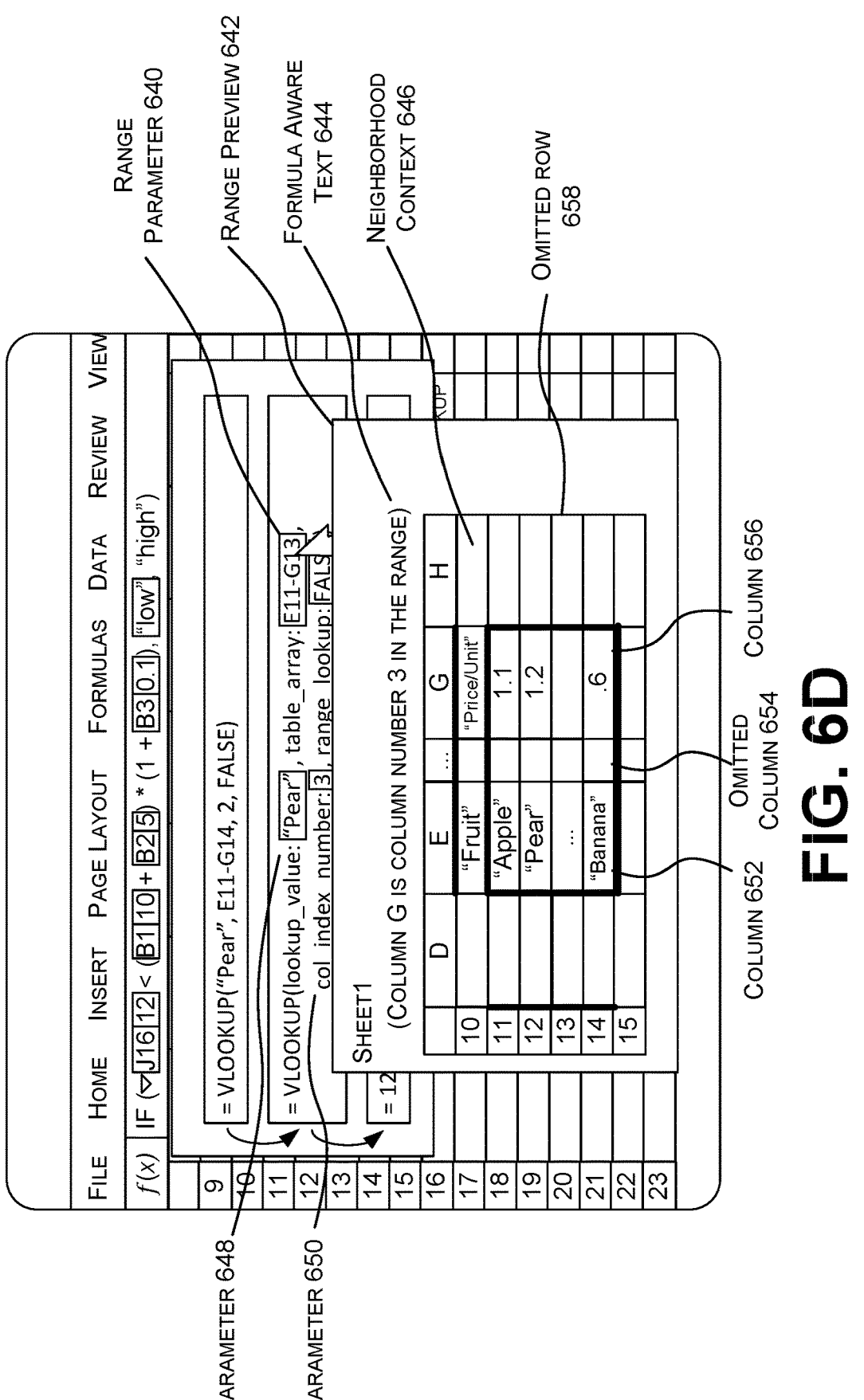

FIG. 6D illustrates range preview pop-up 642. Range preview 642 visualizes table 608—a range of data found on spreadsheet 600. Range preview 642 may be displayed in response to a user selecting range parameter 640. As illustrated, range parameter 640 is a range reference that appears as part of enhanced formula 636. However, enhanced formula 636 is just one example of a location of a range reference, and any other location is similarly contemplated. For example, a range reference may be part of a cell, part of a formula displayed in formula bar 102, part of stepped evaluation 530, or anywhere else that a reference to a cell may appear. In some configurations a UI widget is overlaid on top of range parameter 640 and may be activated to display range preview 642.

In some cases, table 608 may not be visible on the same screen as range parameter 640, making it more difficult to understand formula 604. For example, in order to think about how data contained in table 608 is evaluated by formula 604, users may scroll back and forth between formula 604 and table 608. Range preview 642 addresses this deficiency by enabling table 608 and range parameter 640 to be displayed on the same screen and at the same time.

Range preview 642 may include a description of which sheet range 640 appears in, e.g., "Sheet1". Range preview 642 may also include formula-aware text about formula 604. Formula-aware text is descriptive text obtained from information known about the formula and from analyzing the use of built-in spreadsheet functions. As illustrated, range preview 642 includes the text "Column G is column number 3 in the range". This text may be derived from an analysis of the use of the VLOOKUP function, such as the 'col_index_number" parameter, in conjunction with the location of the data range. For example, with VLOOKUP, the column_index_number parameter indicates which column the return value should be selected from. Column_index_number is commonly provided as an index, such as '3'. Knowing that this parameter is an index into the range specified by the table_array parameter, it can be determined that the result of VLOOKUP comes from column G.

Data ranges in a spreadsheet can be large, both the number of rows and the number of columns. Often it is not possible to view all columns or all rows of a range on screen at once. For example, a table with 20 columns may not fit into a single screen at a level of zoom that allows all columns to be visible. It can be challenging to debug a formula that references data in columns that are not easily viewed on the same screen.

To address this problem, some embodiments elide columns or rows from the range displayed in range preview 642. This conserves space and allows important data to be presented to the user on the same screen without scrolling. Range preview 642 may elide columns or rows based on information known about a function. For example, when a range is a parameter to a call to VLOOKUP, other parameters passed to the same invocation of VLOOKUP can be used to select which columns to show and which to hide. Columns that are referenced by a parameter to the function, directly or indirectly, are included, while columns that are not referenced by a parameter are candidates for elision. As illustrated, column 652 and column 656 are displayed, while omitted column 654 is elided.

Rows may also be elided. This may reduce the amount of data provided in range preview 642. Rows may be included in range preview 642 based an analysis of the parameters of function 639. For example, a VLOOKUP function that searches for "Pear" will not have rows that match "Pear" elided. Rows that do not match, such as omitted row 658, then become candidates for elision. Elided columns/rows may be completely removed, or a UI element such as ellipses may remain as a placeholder of the elided content.

In some configurations, a range preview displays data that surrounds the range-referred to as the neighborhood context. The neighborhood context may include any cells that are adjacent to range 608, relevant to range 608, but not actually part of range 608, such as headers 606. Including these cells may provide crucial context information to a user. For example, header 606 provides context as to the meanings of the columns of table 608. Providing this additional context makes it easier to understand the correctness of formula 604.

Figure 7:
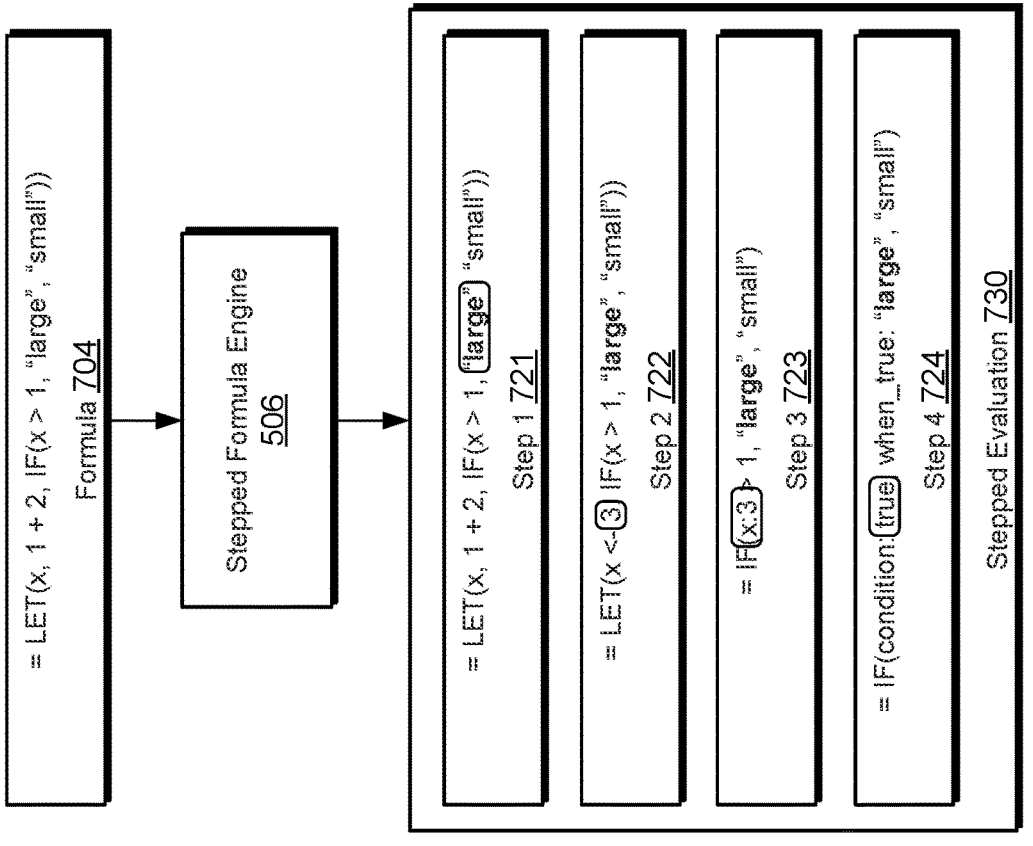
FIG. 7 illustrates annotating nodes with the names of their child bindings.

FIG. 7 illustrates annotating nodes with the names of their child bindings. In particular, this screenshot shows "[x: 3]", thereby annotating the value "3" with the name of the binding "x". In this example, the value of x is defined by the LET binding expression "LET" (x<−3 . . . ".

FIG. 7 also illustrates using argument-specific information about a built-in function. In FIG. 7, the argument-specific information is used to infer parameter names. Specifically, the function parameters to the 'IF' function are annotated in step 724. The first parameter is annotated with the name "condition"—e.g., "condition: [true]"—and the second parameter is annotated with the name "when_true"—e.g., "when_true: [" large "]". Both of these annotations originate from the function parameters of the 'IF' function.

Specifically, formula 704, LET(x, 1+2, IF (x>1, "large", "small")) contains two function calls, one nested within the other. Stepped formula engine 506 generates stepped evaluation 730, which contains steps 721-724, similar to stepped evaluation 530 discussed above in conjunction with FIG. 5.

Step 721 illustrates formula 704 itself, unchanged. This provides the user with context when viewing the other steps of the evaluation. "large" of the IF function is bolded, indicated that of the two possible results, "large" will currently be selected. Step 722 illustrates formula 704 after evaluation the "1+2" expression to "3". The left arrow in "x<–3" indicates that the value "3" is bound to the variable "x" for the LET expression.

Step 723 illustrates evaluation after the LET function has resolved the value of x, and all that is left to do is evaluate the IF function. "x:3" illustrates the value of "x" for this evaluation. Step 724 is a final step that evaluates the expression "x:3>1" to "true". Step 724 also labels the parameters of the IF function. The first parameter is labeled "condition", and the second parameter is labeled "when_true". The third parameter could be labeled "when_false". Parameter names may be obtained from a function metadata store that describes parameters names.

As referred to herein, a formula refers to a user generated expression that invokes other formulas, invokes functions, contains literal values, and/or obtains values from spreadsheet cells. The LET function is one example of a binding function found in MICROSOFT EXCEL. Binding functions with different names are similarly contemplated.

FIG. 8 is a flow diagram of an example method for stepped evaluation of a spreadsheet formula. Routine 800 begins at operation 802, where an abstract syntax tree 204 is generated for a spreadsheet formula 104.

Next at operation 804, a value of a node of the abstract syntax tree is evaluated. This node may be evaluated in part by accessing values from the spreadsheet. For example, if the formula contains a reference to cell "A1", such as "A1+2", then the value of the '+' node may obtain the value stored in cell "A1" while evaluating the '+' node. In some configurations, the value of the node is evaluated as part of an evaluation traversal of abstract syntax tree 204.

Next at operation 806, a second plurality of nodes are selected from abstract syntax tree 204 having a same distance from a root of abstract syntax tree 204. The root of abstract syntax tree 204 refers to a node at the top of the abstract syntax tree—often an operator with a lowest precedence. The second plurality of nodes is a step, such as step 421.

Next at operation 808, a sub-expression of formula 104 is identified within the second plurality of nodes. The sub-expression may be an operator, a function invocation, or any other node that has a value stored in sub-expression to value map 270.

Next, at operation 810, the formula is displayed with the value of the node, obtained from sub-expression to value map 270, replacing the sub-expression. This visualization, in the context of surrounding steps that have more or fewer nodes (more nodes towards the leaves of the syntax tree, fewer nodes towards the root), enables a user to see how the formula is evaluated step-by-step. Each step shows a meaningful portion of the evaluation, in part because multiple evaluations are displayed in the same step, and in part because abstract syntax tree 204 is culled during the modification traversal.

Figure 9:
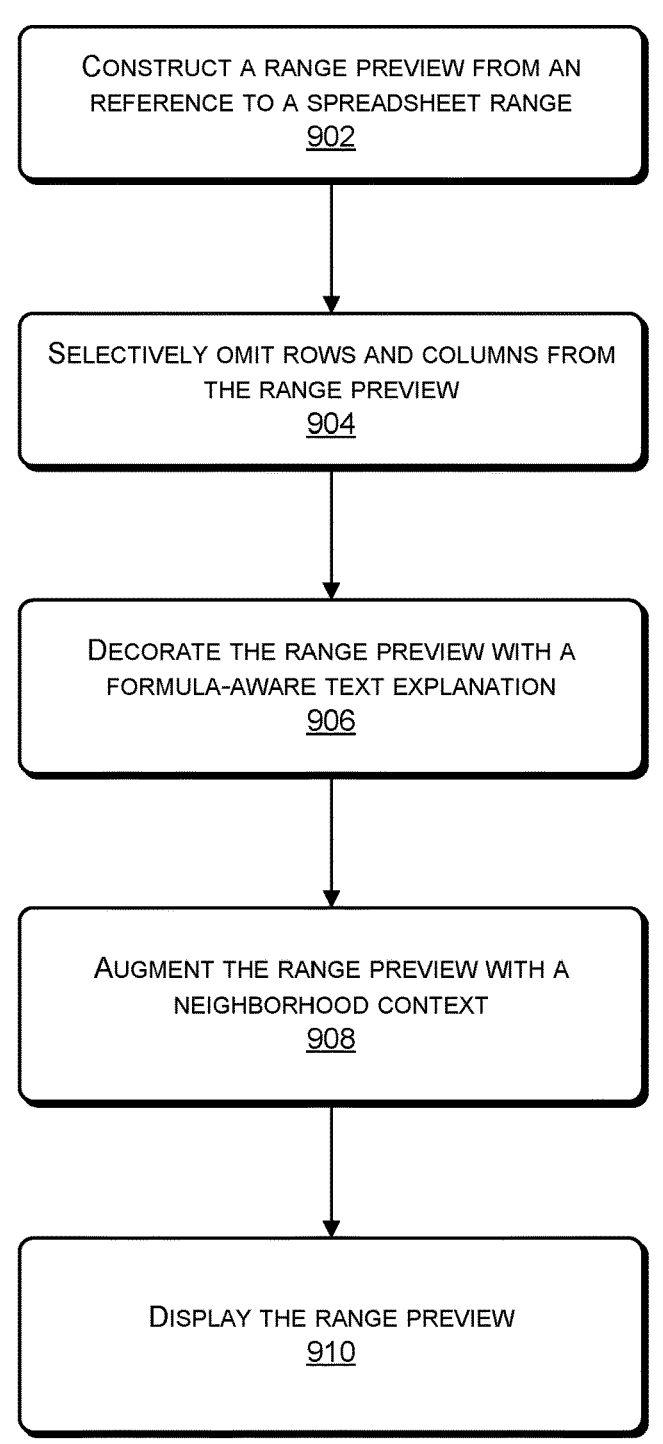
FIG. 9 is a flow diagram of an example method for range preview.

FIG. 9 is a flow diagram of an example method for constructing a range preview 642 of a range 608. Routine 900 begins at operation 902, where a reference 640 to a spreadsheet range 608 is received. For example, a user may hover over a reference to a range displayed in a spreadsheet cell, or over a reference to a range in one of the steps of a stepped evaluation. The range preview 642 may be constructed from data located in the referenced range 608, as discussed above in conjunction with FIG. 6.

Next at operation 904, rows and columns are selectively omitted from the range preview 642. These omissions may be made based on information about a function 639 that the range reference 640 is a parameter of. For example, other parameters 648 to the function 649 may indicate which columns to show 652 and which columns to elide 654.

Lookup functions, such as VLOOKUP, which scan a table for a particular value, may elide rows that are not a match. For example, a VLOOKUP function that searches for "Pear", will not elide a row that matches "Pear".

Next at operation 906, the range preview is decorated with a formula-aware text explanation 644. The text explanation 644 may be located within a popup that contains the range preview 642. The text explanation may be constructed based on precomputed metadata about a function 639 that the range is a parameter of. For example, metadata may indicate which parameters of a function are references to a column of a range, such as the "col_index_number" parameter of VLOOKUP.

Next at operation 908, the range preview is augmented with a neighborhood context. The neighborhood context may include header 606, an auto-sum of a column or row, or other cells that are proximate to the range and may be relevant to understanding the range, but are not actually part of the range.

Next, at operation 910, the range preview is displayed. The range preview 642 may be displayed in response to a user selecting, hovering over, or otherwise performing a user interface command associate with a reference 640 to the range 608.

Figure 10:
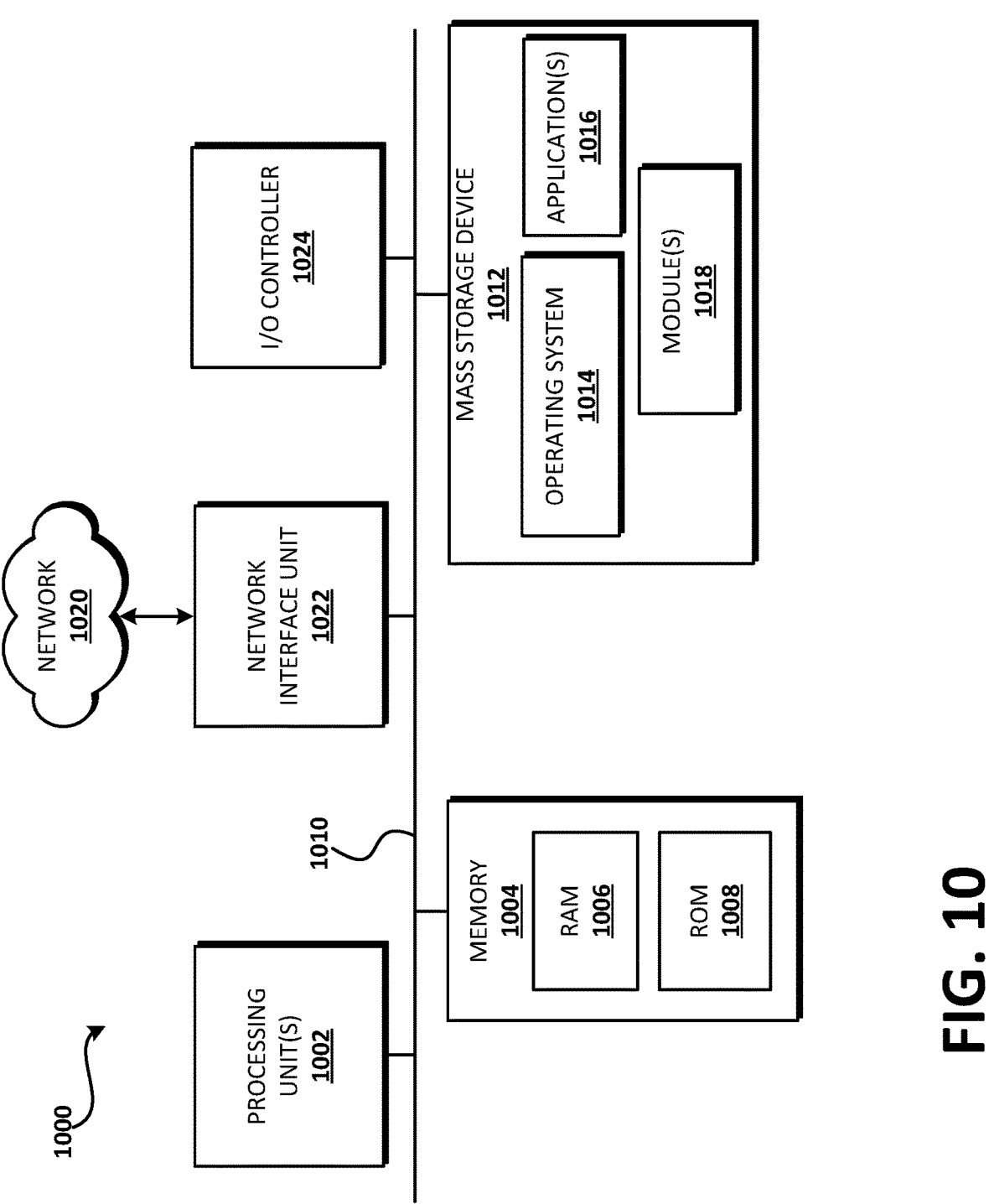
FIG. 10 shows a computer architecture diagram of a computing device capable of implementing aspects of the techniques and technologies presented herein.

FIG. 10 shows additional details of an example computer architecture 1000 for a device, such as a computer or a server configured as part of the systems described herein, capable of executing computer instructions (e.g., a module or a program component described herein). The computer architecture 1000 illustrated in FIG. 10 includes processing unit(s) 1002, a system memory 1004, including a random-access memory 1006 ("RAM") and a read-only memory ("ROM") 1008, and a system bus 1010 that couples the memory 1004 to the processing unit(s) 1002. The processing unit(s) 1002 include one or more hardware processors and may also comprise or be part of a processing system. In various examples, the processing unit(s) 1002 of the processing system are distributed. Stated another way, one processing unit 1002 may be located in a first location (e.g., a rack within a datacenter) while another processing unit 1002 of the processing system is located in a second location separate from the first location.

Processing unit(s), such as processing unit(s) 1002, can represent, for example, a CPU-type processing unit, a GPU-type processing unit, a neural processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 1000, such as during startup, is stored in the ROM 1008. The computer architecture 1000 further includes a mass storage device 1012 for storing an operating system 1014, application(s) 1016, modules 1018, and other data described herein. 10

The mass storage device 1012 is connected to processing unit(s) 1002 through a mass storage controller connected to the bus 1010. The mass storage device 1012 and its associated computer-readable media provide non-volatile storage for the computer architecture 1000. Although the description of computer-readable media contained herein refers to a mass storage device, it should be appreciated by those skilled in the art that computer-readable media can be any available computer-readable storage media or communication media that can be accessed by the computer architecture 1000.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 1000 may operate in a networked environment using logical connections to remote computers through the network 1020. The computer architecture 1000 may connect to the network 1020 through a network interface unit 1022 connected to the bus 1010. The computer architecture 1000 also may include an input/output controller 1024 for receiving and processing input from a number of other devices, including a keyboard, mouse, touch, or electronic stylus or pen. Similarly, the input/output controller 1024 may provide output to a display screen, a printer, or other type of output device.

It should be appreciated that the software components described herein may, when loaded into the processing unit(s) 1002 and executed, transform the processing unit(s) 1002 and the overall computer architecture 1000 from a general-purpose computing system into a special-purpose computing system customized to facilitate the functionality presented herein. The processing unit(s) 1002 may be constructed from any number of transistors or other discrete circuit elements, which may individually or collectively assume any number of states. More specifically, the processing unit(s) 1002 may operate as a finite-state machine, in response to executable instructions contained within the software modules disclosed herein. These computer-executable instructions may transform the processing unit(s) 1002 by specifying how the processing unit(s) 1002 transition between states, thereby transforming the transistors or other discrete hardware elements constituting the processing unit(s) 1002.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Illustrative Embodiments

The following clauses describe multiple possible embodiments for implementing the features described in this disclosure. The various embodiments described herein are not limiting nor is every feature from any given embodiment required to be present in another embodiment. Any two or more of the embodiments may be combined together unless context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

Example 1: A method for visualizing execution of a formula, comprising: generating an abstract syntax tree of the formula; computing a value of a node of a plurality of nodes of the abstract syntax tree; selecting a second plurality of nodes from the abstract syntax tree that have a same distance from a root of the abstract syntax tree; identifying a sub-expression of the formula that corresponds to the node; and displaying the formula with the value of the node replacing the sub-expression.

Example 2: The method of Example 1, further comprising: traversing the abstract syntax tree to evaluate at least the node of the plurality of nodes; storing the value of the node in a sub-expression to value map; wherein the value of the node used to replace the sub-expression is retrieved from the sub-expression to value map.

Example 3: The method of Example 1, further comprising: modifying the abstract syntax tree.

Example 4: The method of Example 3, wherein the abstract syntax tree is modified by combining nodes of adjacent operators with a same precedence into a single node.

Example 5: The method of Example 3, wherein the abstract syntax tree is modified by replacing a parenthesis node with a child node of the parenthesis node.

Example 6: The method of Example 6, wherein a node type of the child of the parenthesis node is made a parenthesis node.

Example 7: The method of Example 3, wherein the abstract syntax tree is modified by deleting a literal node.

Example 8: A system comprising: a processing unit; and a computer-readable storage medium having computer-executable instructions stored thereupon, which, when executed by the processing unit, cause the processing unit to: generate an abstract syntax tree of a formula that includes a reference to a cell of a spreadsheet; compute a value of a node of a plurality of nodes of the abstract syntax tree based in part on a value of the cell; select a second plurality of nodes from the abstract syntax tree that have a same distance from a root of the abstract syntax tree; identify a sub-expression of the formula that corresponds to the node; and display the formula with the value of the node replacing the sub-expression.

Example 9: The system of Example 8, wherein the computer-executable instructions further cause the processing unit to: perform a node evaluation traversal of the abstract syntax tree that evaluates at least the node of the plurality of nodes; store the value of the node in a sub-expression to value map; wherein the value of the node used to replace the sub-expression is retrieved from the sub-expression to value map.

Example 10: The system of Example 9, wherein the computer-executable instructions further cause the processing unit to: perform a modification traversal of the abstract syntax tree, wherein the modification traversal visits the plurality of nodes from bottom to top and left to right; and modify at least one of the plurality of nodes visited during the modification traversal.

Example 11: The system of Example 10, wherein performing the modification traversal comprises: determining that an individual node comprises an operator node; and replacing the individual node in the abstract syntax tree with a new node, wherein a child node of the individual node becomes a child node of the new node.

Example 12: The system of Example 10, wherein performing the modification traversal comprises: determining that an individual node comprises an operator node; determining that a child node of the individual node comprises another operator node having a same operator precedence as the operator node; and replacing the individual node in the abstract syntax tree with a new node, wherein a grandchild node of the individual node becomes a child node of the new node.

Example 13: The system of Example 10, wherein performing the modification traversal comprises: determining that an individual node comprises a built-in function node; and annotating a child node of the built-in function node with a parameter name or a documentation.

Example 14: The system of Example 10, wherein performing the modification traversal comprises: determining that an individual node comprises a variable binding node; and annotating a child node of the variable binding with a binding name.

Example 15: The system of Example 10, wherein performing the modification traversal comprises: replacing an individual node with itself.

Example 16: A computer-readable storage medium having encoded thereon computer-readable instructions that when executed by a processing unit cause a system to: generate an abstract syntax tree of a spreadsheet formula; perform a node evaluation traversal of the abstract syntax tree that computes a value of a node of a plurality of nodes of the abstract syntax tree; perform a modification traversal of the abstract syntax tree that replaces at least one of the plurality of nodes of the abstract syntax tree; select a second plurality of nodes from the abstract syntax tree that have a same distance from a root of the abstract syntax tree; identify a sub-expression of the formula that corresponds to the node; and display the formula with the value of the node replacing the sub-expression.

Example 17: The computer-readable storage medium of Example 16, wherein the instructions further cause the system to: group the plurality of nodes of the abstract syntax tree into a plurality of steps, wherein each step comprises nodes having a same distance from a root of the abstract syntax tree.

Example 18: The computer-readable storage medium of Example 17, wherein the plurality of nodes are grouped into the plurality of steps by traversing the nodes of the abstract syntax tree from bottom to top, assigning each node to a step that is one closer to the root of the abstract syntax tree than a child node that is closest to the root of the abstract syntax tree.

Example 19: The computer-readable storage medium of Example 18, wherein the instructions further cause the system to: determine that an orphan node is included in one of the plurality of steps but not in another of the plurality of steps that is closer to the root of the abstract syntax tree; and copy the orphan node to the other of the plurality of steps.

Example 20: The computer-readable storage medium of Example 17, wherein the instructions further cause the system to: display the plurality of steps, wherein each node included in each step is replaced with a corresponding value computed during the node evaluation traversal.

CONCLUSION

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The terms "a," "an," "the" and similar referents used in the context of describing the invention are to be construed to cover both the singular and the plural unless otherwise indicated herein or clearly contradicted by context. The terms "based on," "based upon," and similar referents are to be construed as meaning "based at least in part" which includes being "based in part" and "based in whole," unless otherwise indicated or clearly contradicted by context. The terms "portion," "part," or similar referents are to be construed as meaning at least a portion or part of the whole including up to the entire noun referenced.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Furthermore, references have been made to publications, patents and/or patent applications throughout this specification. Each of the cited references is individually incorporated herein by reference for its particular cited teachings as well as for all that it discloses.

What is claimed is:

1. A method for visualizing execution of a formula, comprising:

generating an abstract syntax tree of the formula;

computing a value of a node of a plurality of nodes of the abstract syntax tree;

identifying a first sub-expression of the formula that corresponds to the node;

performing a step-by-step evaluation of the formula over a plurality of steps; and causing display of an execution trace of the formula comprising a plurality of representations of the formula at the plurality of steps of evaluation, including a first representation of the formula with the first sub-expression and a second representation of the formula with the value of the node replacing the first sub-expression, and wherein a second sub-expression of the formula remains unchanged from the first representation to the second representation.

2. The method of claim 1, further comprising:

storing the value of the node in a sub-expression to value map; wherein the value of the node used to replace the first sub-expression is retrieved from the sub-expression to value map.

3. The method of claim 1, further comprising:

condensing the abstract syntax tree, wherein the node of the plurality of nodes of the abstract syntax tree is evaluated before the abstract syntax tree is condensed.

4. The method of claim 3, wherein the abstract syntax tree is condensed by combining nodes of adjacent operators with a same precedence into a single node.

5. The method of claim 3, wherein the abstract syntax tree is condensed by replacing a parenthesis node with a child node of the parenthesis node.

6. The method of claim 5, wherein a node type of the child of the parenthesis node is made a parenthesis node.

7. The method of claim 3, wherein the abstract syntax tree is condensed by deleting a literal node.

8. A system comprising:

a processing unit; and a computer-readable storage medium having computer-executable instructions stored thereupon, which, when executed by the processing unit, cause the processing unit to:

generate an abstract syntax tree of a formula that includes a reference to a cell of a spreadsheet;

compute a value of a node of a plurality of nodes of the abstract syntax tree based in part on a value of the cell;

identify first a sub-expression of the formula that corresponds to the node;

perform a step-by-step evaluation of the formula over a plurality of steps; and display an execution trace of the formula comprising a plurality of representations of the formula at the plurality of steps of evaluation, including a first representation of the formula with the first sub-expression and a second representation of the formula with the value of the node replacing the first sub-expression, and wherein a second sub-expression of the formula remains unchanged from the first representation to the second representation.

9. The system of claim 8, wherein the computer-executable instructions further cause the processing unit to:

perform a node evaluation traversal of the abstract syntax tree that evaluates at least the node of the plurality of nodes;

store the value of the node in a sub-expression to value map; wherein the value of the node used to replace the first sub-expression is retrieved from the sub-expression to value map.

10. The system of claim 9, wherein the computer-executable instructions further cause the processing unit to:

perform a modification traversal of the abstract syntax tree, wherein the modification traversal visits the plurality of nodes from bottom to top and left to right; and modify at least one of the plurality of nodes visited during the modification traversal.

11. The system of claim 10, wherein performing the modification traversal comprises:

determining that an individual node comprises an operator node; and replacing the individual node in the abstract syntax tree with a new node, wherein a child node of the individual node becomes a child node of the new node.

12. The system of claim 10, wherein performing the modification traversal comprises:

determining that an individual node comprises an operator node;

determining that a child node of the individual node comprises another operator node having a same operator precedence as the operator node; and replacing the individual node in the abstract syntax tree with a new node, wherein a grandchild node of the individual node becomes a child node of the new node.

13. The system of claim 10, wherein performing the modification traversal comprises:

determining that an individual node comprises a built-in function node; and annotating a child node of the built-in function node with a parameter name or a documentation.

14. The system of claim 10, wherein performing the modification traversal comprises:

determining that an individual node comprises a variable binding node; and annotating a child node of the variable binding with a binding name.

15. The system of claim 10, wherein performing the modification traversal comprises:

replacing an individual node with itself.

16. A non-transitory computer-readable storage medium having encoded thereon computer-readable instructions that when executed by a processing unit cause a system to:

generate an abstract syntax tree of a spreadsheet formula;

perform a node evaluation traversal of the abstract syntax tree that computes a value of a node of a plurality of nodes of the abstract syntax tree;

perform a modification traversal of the abstract syntax tree that replaces a superfluous node with a child node of the superfluous node, combines a plurality of same precedence nodes into a single node, or annotates a node with a parameter name identify a first sub-expression of the formula that corresponds to the node; and display an execution trace of the formula comprising a plurality of representations of the formula at a plurality of steps of evaluation, including a first representation of the formula with the first sub-expression and a second representation of the formula with the value of the node replacing the first sub-expression, and wherein a second sub-expression of the formula remains unchanged from the first representation to the second representation.

17. The non-transitory computer-readable storage medium of claim 16, wherein each step of the plurality of steps comprises nodes having a same distance from a root of the abstract syntax tree.

18. The non-transitory computer-readable storage medium of claim 17, wherein the plurality of nodes are grouped into the plurality of steps by traversing the nodes of the abstract syntax tree from bottom to top, assigning each node to a step that is one closer to the root of the abstract syntax tree than a child node that is closest to the root of the abstract syntax tree.

19. The non-transitory computer-readable storage medium of claim 18, wherein the instructions further cause the system to:

determine that an orphan node is included in one of the plurality of steps but not in another of the plurality of steps that is closer to the root of the abstract syntax tree; and copy the orphan node to the other of the plurality of steps.

20. The non-transitory computer-readable storage medium of claim 17, wherein the instructions further cause the system to:

display the plurality of steps, wherein at least one node included in each step is replaced with a corresponding value computed during the node evaluation traversal.

* * * * *